(12) United States Patent
Kalverkamp

(10) Patent No.: US 12,196,032 B2
(45) Date of Patent: Jan. 14, 2025

(54) FRAME PROFILE OF AN OUTER FRAME AND/OR LEAF FRAME, AND METHOD FOR THE PRODUCTION THEREOF

(71) Applicant: VEKA AG, Sendenhorst (DE)

(72) Inventor: Philipp Kalverkamp, Sendenhorst (DE)

(73) Assignee: VEKA AG, Sendenhorst (DE)

(*) Notice: Subject to any disclaimer, the term of this patent is extended or adjusted under 35 U.S.C. 154(b) by 337 days.

(21) Appl. No.: 17/912,056

(22) PCT Filed: Mar. 18, 2021

(86) PCT No.: PCT/EP2021/056907
§ 371 (c)(1),
(2) Date: Sep. 16, 2022

(87) PCT Pub. No.: WO2021/185945
PCT Pub. Date: Sep. 23, 2021

(65) Prior Publication Data
US 2023/0175310 A1 Jun. 8, 2023

(30) Foreign Application Priority Data
Mar. 18, 2020 (EP) .................................. 20164024.0

(51) Int. Cl.
*E06B 3/22* (2006.01)
*B29C 48/12* (2019.01)

(52) U.S. Cl.
CPC ............... *E06B 3/22* (2013.01); *B29C 48/12* (2019.02); *E06B 3/221* (2013.01)

(58) Field of Classification Search
None
See application file for complete search history.

(56) References Cited

U.S. PATENT DOCUMENTS

| 4,397,116 | A | * | 8/1983 | Habicht | E06B 5/162 49/501 |
| 6,035,600 | A | * | 3/2000 | Habicht | E06B 3/26305 52/656.5 |
| 8,176,709 | B2 | * | 5/2012 | Siodla | E06B 3/26303 52/204.5 |
| 2005/0183351 | A1 | * | 8/2005 | Brunnhofer | E06B 3/26305 52/579 |

FOREIGN PATENT DOCUMENTS

| DE | 25 15 536 A1 | 10/1976 |
| DE | 3032939 A1 | 4/1982 |
| DE | 10 2006 032 179 A1 | 1/2008 |
| DE | 10 2013 114 710 A1 | 6/2015 |

(Continued)

*Primary Examiner* — Joshua K Ihezie
(74) *Attorney, Agent, or Firm* — Norman B. Thot

(57) ABSTRACT

The present invention relates to a frame profile of an outer frame and/or leaf frame of a window or of a door, with a core profile of plastic, wherein a casing shell is arranged on at least one of the oppositely situated outer walls of the core profile, wherein at least one of the outer walls has at least one fastening groove which extends in the longitudinal direction of the core profile, wherein the casing shell is fastened to and/or in the fastening groove and covers the fastening groove. The present invention also relates to a method for producing a frame profile.

12 Claims, 19 Drawing Sheets

(56) References Cited

FOREIGN PATENT DOCUMENTS

| | | |
|---|---|---|
| DE | 20 2015 103 240 U1 | 8/2015 |
| EP | 0 425 753 A1 | 5/1991 |
| EP | 0 517 057 A2 | 12/1992 |
| EP | 2 594 720 A2 | 5/2013 |
| GB | 2464558 A | 4/2010 |
| WO | WO 00/75472 A1 | 12/2000 |
| WO | WO 2017/047906 A1 | 3/2017 |

* cited by examiner

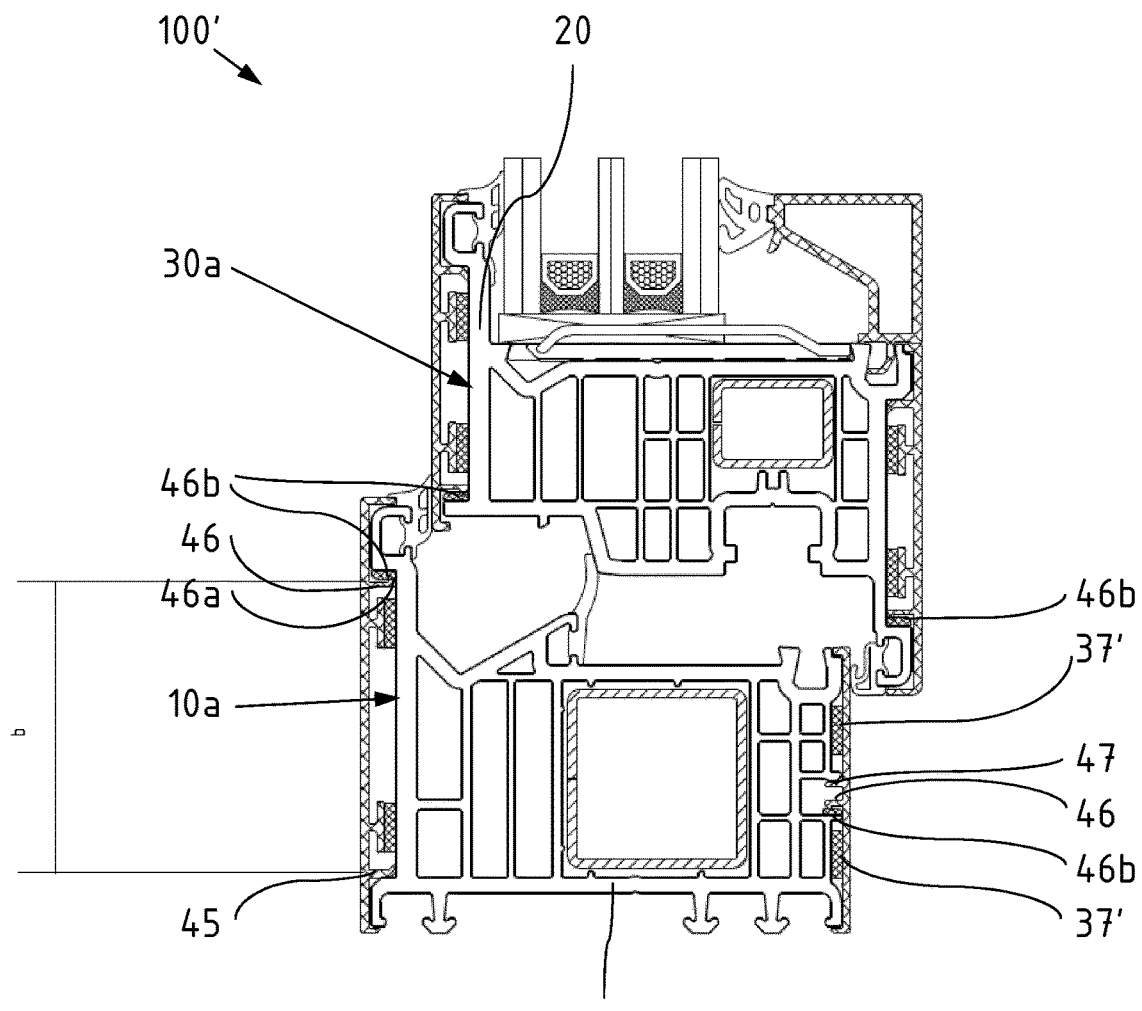
Fig. 4bb
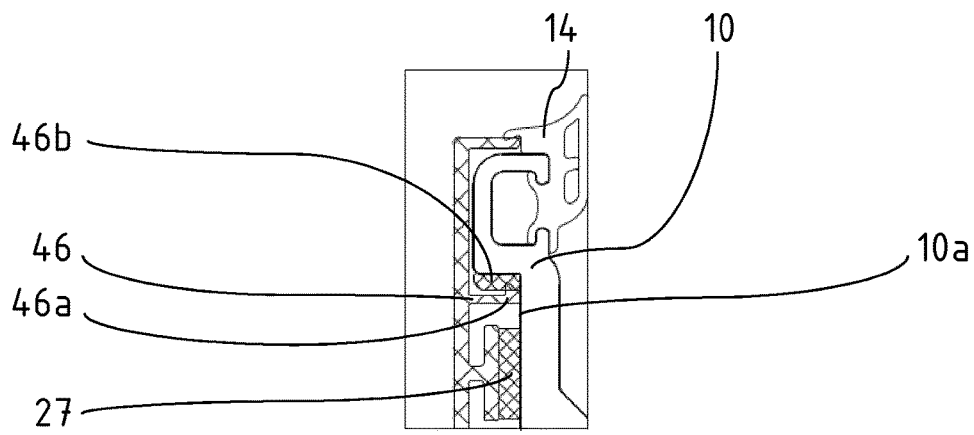
Detail 4bb

FRAME PROFILE OF AN OUTER FRAME AND/OR LEAF FRAME, AND METHOD FOR THE PRODUCTION THEREOF

The invention relates to a frame profile of an outer frame and/or leaf frame of a window or a door, comprising a core profile of plastics material, wherein a casing shell is disposed on at least one external wall, preferably on both of the mutually opposite external walls, of the core profile. The invention furthermore relates to a method for producing such a frame profile, as well as also to a method for connecting the corners of such frame profiles.

External walls of the core profile are understood to be those walls that in the later use of the frame profile, for example when a frame, or overall a window or a door, is formed from said frame profile, point toward the interior of the room and toward the external environment of a building in which the frame profile is installed. These external walls are thus on the building inside and on the building outside of the frame profile and are furthermore mutually opposite in a direction which is parallel to the surface normal of the plane of a frame formed from the frame profiles, or of a windowpane bordered by said frame, respectively. The direction of the spacing of the external walls is also understood to be the direction of the width or depth of the frame profile. The direction of the height is perpendicular to the width/depth and to the longitudinal extent of the core profile. The core profile is an extruded plastics profile, usually having hollow chambers, and thus has the same cross section at each location of the extent of said core profile. In terms of the material, the core profile can be configured from uPVC, for example.

Doors and windows from plastics material, for example PVC, are a component part of a modern construction mode. The carrier element, plastics material, apart from the low investment costs, offers a high level of acoustic and thermal protection, simple cleaning, and high durability. Plastics windows, in particular in terms of the production of the frame, are distinguished by an automated corner-welding connection technique which leads to joint-free and tight connections.

Metal windows, in particular aluminum windows, are satisfying in terms of very high stability, durability and resistance to weather. The cladding of plastics profiles with casing shells, predominantly from aluminum, often takes place for visual reasons, wherein casing shells from aluminum can be anodized, painted, powder-coated or laminated in various colors.

It is known from EP 0 517 057 A2 for the outer frames and the leaf frames after corner-welding of the frame profiles first to be provided with button-shaped holders onto which the aluminum casing shells are subsequently clip-fitted. To this end, the aluminum casing shells have two pairs of likewise undercut fastening ribs, the respective spacing of which corresponds to the button diameter of the trunnion bolt.

The mountings here have to be positioned very exactly on the frame profiles of the outer frame or the leaf frame, respectively; special corner connections are additionally required in the corner region. This construction requires relatively thick aluminum casing shells because the fastening ribs and the trunnion bolts require an additional ramp for clip-fitting.

A further disadvantage of the profile system of the generic type lies in that water can make its way between the plastics profiles and the aluminum casing shells.

The claddings with aluminum casing shells described in the prior art are only suitable for retrofitting frames that have already been completely assembled, and have to be subsequently assembled by way of complex manual labor. The corner connections of the window frames represent the greatest challenge here. Plastics material, for example PVC, and aluminum have different behaviors in the event of temperature variations and, owing to the dissimilar material expansions, this can lead to gaps forming in particular in the corner regions. For this reason, the corner connections are made with butt joints when the plastics profiles are subsequently cladded with metal profiles as casing shells.

The object of the invention lies in offering a strand-shaped frame profile which is prefabricated as a semi-finished product and has visible external walls of casing shells, preferably from metal casing shells, and furthermore preferably from aluminum casing shells, and a plastics core profile lying between these casing shells, thus an internal plastics core profile, for example a plastics hollow-chamber profile. It is preferably a further object to provide a stable frame profile, which however is optimized in terms of material and has a maximum proportion of plastics material and a minimum proportion of material in the casing shells, said frame profile preferably being able to be offered in standard dimensions for producing standardized window or door frames. It is furthermore preferably provided that the added thickness on the core profile as a result of the casing shells is to be kept ideally minor, and that furthermore preferably the casing shells are also used to contribute to the static load bearing capability of the frame profile, or of frames formed therefrom, respectively.

It is furthermore preferably an object to combine the advantages of a plastic window with those of a cladded window or of an aluminum window.

It is a further preferred object to provide frame profiles with casing shells from which completed leaf frames or outer frames for windows or doors can be produced in an efficient and time-saving manner by machines in one operative process—in particular in terms of the corner connection. Moreover to be offered is an automated method which guarantees a corner connection for avoiding gaps in the corner regions of plastic profiles provided with casing shells while maintaining the highest possible stability.

The object is achieved according to the invention in that in a frame profile of the type mentioned at the outset at least one of the external walls, preferably both external walls, have at least one fastening groove which extends in the longitudinal direction of the core profile, preferably extends across the entire length of the core profile, wherein the casing shell is fastened to and/or in the fastening groove and covers the fastening groove, preferably covers the entire external wall.

In particular, the respective fastening groove in the cross section perpendicular to the direction of longitudinal extent is configured so as to be at least substantially U-shaped, having a groove base between two groove walls. Such a fastening groove, unless the latter has not (yet) been covered by a casing shell, is open toward the outside, thus in particular open toward the interior of the room, or toward the external environment of a building. The groove base preferably lies parallel to the plane of a windowpane of a frame construction formed from the frame profiles.

According to the method, such a frame profile can be produced according to the invention in that in one method step a core profile is extruded from plastics material, in particular a hollow-chamber profile having at least one fastening groove in at least one of the two mutually opposite external walls of the core profile, preferably in each of the two mutually opposite external walls of the core profile, to a predetermined length. The length may correspond to a customary manufacturing length in the field of window construction of 6.5 meters, for example. In a further method step, at least one casing shell, preferably two casing shells, is/are manufactured, for example by extrusion-molding of aluminum, having fastening elements on the internal faces of the casing shells that point toward the core profile, to a predetermined length, in particular of likewise 6.5 meters, and the at least one casing shell by way of the fastening elements thereof is fastened to/in the fastening groove of an external wall of the core profile.

The preferred embodiment is that a respective frame profile on both external walls has in each case at least one fastening groove to/in which one casing shell is in each case fastened. As a result, the frame profile is cladded with casing shells on the inside and the outside.

The advantage of such frame profiles and of the production method lies in that the at least one fastening groove, should the latter extend across the entire profile length of the core profile, can be produced directly during the extrusion of the core profile. According to the invention, fastening of a casing shell takes place to or in the fastening groove such that fastening means can be disposed in the region of the groove clearance and thus do not contribute to an added thickness. A core profile which is provided with casing shells according to the invention can thus configure a combined frame profile according to the invention, which can be configured with a smaller thickness, or which at a predefined thickness, for example according to an industry standard, has a smaller proportion of thickness owing to the casing shell as compared to the prior art.

Furthermore, an external wall having a fastening groove has at least in portions a U-profile which surrounds the groove clearance and which in comparison to an I-shaped wall has a greater static load-bearing capability, or a higher torsional stiffness.

The invention preferably provides that an external wall of the core profile is completely covered by a casing shell. This is preferably understood to mean that all the parts of the external wall are covered by the casing shell that would otherwise be visible when viewed from the outside. In this preferred embodiment, a casing shell thus completely forms the visible face of the frame profile according to the invention that is seen from the outside. In this way, a completed frame can completely assume the visual impact defined by the casing shell. The visual impact here can be provided directly by the material of the casing shell and optionally by the surface structure of the latter. However, a casing shell per se can also have a coating, in particular at least on the visible face pointing outward. In this instance, the visual impact can be defined substantially by the coating.

As a result of the configuration of a fastening groove in the external wall, the external wall is preferably subdivided into two planes, in particular in that the groove base is a part of the external wall that is offset to the rear, in the direction toward the interior of the core profile, behind the first plane of those external wall regions which protrude farthest toward the outside and, extending in the height direction, are adjacent to the ends of the groove walls. The recessed groove base here lies in the second plane. The first and the second plane are preferably mutually parallel.

The invention can provide that a respective casing shell, by way of its internal face that points toward the core profile, bears directly in a contacting manner on the outwardly protruding external wall regions, thus those of the first plane.

Because the fastening elements engage in the groove on the internal face of the casing shells, as has been mentioned above, the thickness added by a casing shell on the core profile can thus be particularly preferably limited to the wall thickness of the casing shell.

Those external wall regions of the external wall that protrude farthest toward the outside preferably lie on the upper and the lower edge regions of a core profile. The fastening elements, preferably all fastening elements provided for fastening to/in the fastening groove, in terms of the total height of a casing shell are then preferably disposed in or about the elongate centerline of the casing shell, preferably at a spacing from the upper and the lower edge regions, such that the internal face of the casing shell can configure edge regions which are limited to the wall thickness and can directly contact the protruding external wall regions.

A frame profile of the invention is thus a combination of an extruded plastics core profile and casing shells by way of which the visible faces of the plastic hollow-chamber profiles are cladded. The casing shells can be selected from an arbitrary material that is chosen for the required application. For example, the casing shells can be configured from timber so as to impart to a plastic window the visual appeal of a timber window. In this case, the casing shells are preferably machined from timber.

The casing shells can likewise and preferably be made from metal, preferably a light metal and particular preferably from aluminum, for example by extrusion-molding. A particularly good protection in relation to weather is achieved as a result.

In the produced combination of the frame profiles according to the invention, the core profiles, preferably hollow-chamber profiles, corresponding to the designation lie in the core of the profile combination, and the casing shells are externally fastened thereto. It is a substantial advantage that the casing shells are not applied to the core profiles/plastic hollow-chamber profiles after the installation of the window or the door, but are already a fixed component part of the frame profiles, in particular a component part of the frame profiles that cannot be released in a non-destructive manner, before the frame profiles are cut to length to a final dimension, in particular also before the corners of the frame profiles are welded.

The plastics core, which is in particular produced from PVC, preferably from uPVC, serves for thermal separation and forms a functional region which serves for noise abatement and thermal insulation. Said plastics core is preferably completely internal, meaning that said plastics core is visible neither from the outside of the building nor from the inside of the building.

To this end, the casing shells preferably reach up to or beyond the fastening regions of the core profile in which the seals in relation to the windowpanes or seals in relation to the neighboring profile are received. The casing shell of a leaf frame profile in this way covers, preferably on the inside and the outside, all core profile regions from the region of the seal in relation to the outer frame profile up to the region of the seal in relation to the windowpane. The casing shell of an outer frame profile covers, preferably on the inside and the outside, all core profile regions from the region of the seal in relation to the leaf frame profile up to the building wall/masonry work/studding.

Furthermore preferably, the casing shells, preferably casing shells on the outside, on edges of the casing shell profile that point toward the panes, can contact the seals which are attached to the core profile/plastic hollow-chamber profile in seal receptacles, in particular grooves.

Furthermore preferably, a glass strip of the frame profile that forms a leaf frame, in particular on the side of the room interior, can be configured from the material of the casing shell such that this results in a continuously consistent visual impact up to the glass insert. Furthermore preferably, the external face of the glass strip is aligned so as to be flush with the external face of the casing shell, in particular aligned so as to be flush without any spacing.

A furthermore preferred embodiment can provide that the casing shell on the core profile of the outer frame and the casing shell on the core profile of the leaf frame that are disposed on the same side, in particular inside and/or outside, of the profiles, by way of the visible faces of said casing shells are disposed so as to be flush, in particular in the same plane. Another embodiment can provide that the visible faces of these two casing shells are mutually offset. It can also be provided that the two casing shells on one of the two sides are disposed so as to be flush, and on the other side of the profiles are disposed so as to be offset.

All these potential embodiments preferably achieve that, when viewed from the outside or the inside, the appearance is dominated, if not totally predefined, by the visual impact of the casing shells.

Outer frames and leaf frames from frame profiles according to the invention, in the core on all four profiles sides are formed from the internal core profile, preferably a plastic hollow-chamber profile, as the carrier material, and on the visible faces that face the later external side and the side of the room interior are cladded with casing shells. In this way, cost-effective recycled plastics materials can also be used in a preferred embodiment, in particular even when this plastics material has an unsightly visual impact.

Aluminum casing shells, at least on the external side of the building, preferably form the water-conducting plane and can resist the weather-related influences such as wind and water.

The shape of the core profile of the frame profiles for the leaf frame as well as for the outer frame is distinguished in that the perpendicularly or vertically running external walls in regions, specifically in the region of the fastening groove, are positioned toward the inside, but this in a particularly preferred embodiment does not result in any weakening of the load-bearing capability or stiffness in comparison to customary constructions, in particular even a higher stiffness is achieved by the U-profile of the external wall as opposed to an I-profile.

The invention can preferably provide that the groove base of the fastening groove is formed by a web of the core profile, in particular of a hollow-chamber profile that forms the core profile, said web running in the height direction and externally delimiting the core profile. In particular, the web at least in regions externally demarcates a hollow chamber of the core profile. The height direction here is preferably viewed perpendicularly to the direction of longitudinal extent, or to the extrusion direction of a core profile, respectively, and parallel to the plane in which the frame or the glass lies, respectively.

This web that forms the groove base, in a particularly preferred embodiment, is a web which predominantly contributes toward the static load-bearing capability of the profile. For this purpose, this web can be configured with the greatest thickness of all webs of the core profile, for example, this in particular not precluding that there are also other webs of the core profile that have the same maximum thickness.

As a result of the visible face of the PVC profile being "recessed", in particular of a PVC profile which in terms of visual impact/construction is otherwise conventional, the previously thickest web as the groove base migrates into the core profile and here has the required thickness that offers sufficient material so as to generate a load-bearing welded connection when the corners are welded.

The invention can preferably also furthermore provide that the groove base of the at least one fastening groove, or of the web that forms the latter, respectively, has a height which is at least 50%, preferably at least 70%, of the total height of that external wall of the core profile in which the fastening groove is provided. Should there be more than just one fastening groove provided on one external wall, this limitation preferably applies to the sum of the heights of the fastening grooves.

After the extrusion process of the core profile, preferably of the plastic hollow-chamber profile, that forms the inner core of the leaf frame as well as of the outer frame, the actual external faces of said profile that will later be visible and are formed by the casing shells, are added to said core profile. This sheathing is carried out on at least one of the visible faces of the core profiles, and preferably on the visible faces of the core profiles on the outside of the building and the inside of the building. Core profiles for leaf frames and outer frames are preferably of dissimilar embodiment in the cross section but have in each case the at least one, preferably the exactly one, fastening groove in the external walls.

The connection of the casing shells to the core profiles can be established in various ways.

According to the invention, a casing shell, in particular a casing shell of metal, preferably aluminum, configured as an extrusion-molded profile, on the internal face thereof that points toward the core profile, for fastening to the core profile, has at least one fastening element which protrudes toward the core profile and by which the casing shell is able to be fastened to and/or in the fastening groove. Such a fastening element, in any type of fastening possibility, preferably lies in the clearance formed by the fastening groove and covered by the casing shell.

Such a fastening element, for example in an extrusion-molded profile, can preferably be configured across the entire length of the casing shell. The fastening element can comprise a web which projects from the casing shell in the direction toward the groove base and comprises in particular a functional headpiece. The fastening can take place by means of the headpiece, the web or both. The web can run perpendicularly (at 90 degrees) to the visible face of the casing shell and/or to the groove base, or else run at other inclined angle arrangements, thus in particular deviate from 90 degrees.

A fastening element can be configured by an adhesive foot, for example, in particular by a protrusion, preferably a protrusion configured as a web, having an adhesive face, which is parallel to the groove base, for receiving adhesive, in particular in a T-shape. The adhesive face here can form the functional headpiece. In this way, a materially integral connection can be established between the casing shell and the core profile, this furthermore leading in particular to the casing shell also providing a statically load-bearing contribution to the overall profile. In a preferred embodiment, the adhesive face can also assume a latching function, in particular in that said adhesive face engages behind an undercut on the fastening groove wall. It can be provided for this embodiment that the casing shell has two adhesive feet which are spaced apart in the height direction, the edges of said adhesive feet that in the height direction point away from one another have a spacing which is smaller than or equal to the groove base height, and larger than or equal to the, in particular smallest, spacing between the groove walls at the location of the undercut.

A fastening element can also be configured as a latching web, in particular for interacting in a latching manner with an undercut on the fastening groove wall. In this case, a web as a functional headpiece can have a latching hook that can engage in an undercut. It can also be provided that the latching web interacts with a depression which is generated by material displacement by the latching web per se, in particular the headpiece thereof, on the fastening groove wall. Such a depression can be created by a notch effect between the harder material of the latching web on the softer material of the core profile.

A fastening element can also be embodied as a positioning web, in particular as a positioning web, which tapers in the direction toward the core profile and by way of which, as a result of contact with the fastening groove wall, the casing shell is able to be aligned in relation to the core profile. Such a positioning fastening element alone does not offer any fastening, but contributes toward the latter, in particular in combination with one of the previously mentioned embodiments of fastening elements. Such a positioning web can be configured without any additional functional headpiece, in particular because the function of the latter is derived by the taper of the web.

In one preferred embodiment, a fastening element can be configured as a connection element, in particular be configured as a web that projects in the direction toward the fastening groove base, preferably having an end-proximal headpiece, in particular having a headpiece which is wedge-shaped or thickened at least in relation to the web, and which at least in regions is able to be brought to bear in a contacting manner on a connection partner and/or is able to be embedded in a connection partner that is fastened to the fastening groove wall, preferably integrally extruded thereon. Such a connection partner can preferably be configured from a material which is softer in comparison to the material of the core profile (for example uPVC) and/or of the casing shell, preferably from soft PVC. Soft PVC is a PVC plastics material with additional percentages of plasticizers, the latter causing the lesser hardness in comparison to uPVC. This connection partner can be fastened to at least one of the two fastening groove walls so as to point toward the interior of the groove, in particular so as to contact the groove base or at a spacing from the groove base, the latter in particular potentially configuring an undercut.

In the connection between the connection element and the connection partner it is provided that the connection element, in particular by way of the web thereof and/or the headpiece, contacts the connection partner and/or is embedded in the latter as a result of a material displacement generated by the connection element in the connection partner.

Such a displacement can arise as a result of a movement of the connection element at least in regions into the connection partner. This is possible in particular because the connection element is preferably configured from the material of the casing shell, in particular from metal, preferably aluminum, and the material of the connection partner is softer, for example soft PVC. In the connection thus established, the connection partner as a result of the displacement can in regions adapt in particular to the shape of the connection element, in particular at least at the location of the existing contact/embedding.

A fastening element can also be configured as a reference web, the latter preferably having the greatest thickness of all fastening elements, in particular being able to be brought to bear on one of the two fastening groove walls. Said fastening element can preferably be configured with a run-up ramp or a run-up curve which points toward the groove base, said run-up ramp or run-up curve configuring in particular the functional headpiece. Such a reference web can be disposed at a spacing from another fastening element, for example the above-mentioned connection element.

The reference web is preferably such a fastening element which does not cause any latching connection between the casing shell and the core profile. A connection between the reference web and the fastening groove wall preferably takes place only in a friction-fitting and/or force-fitting manner. As a result, the casing shell is in particular fastened only so as to be clamped, preferably by a force which acts normally, thus perpendicularly to the fastening groove wall, between the latter and the reference web. This force is created substantially only when the casing shell lies completely in/on the fastening groove.

The reference web preferably serves as a positioning reference when bringing the casing shell to bear on the core profile. As a result of the reference web, the casing shell is positioned parallel to the core profile and at the correct height level, without already having a fastening effect. To this end, the casing shell, with the reference web at the front, is placed on the fastening groove wall such that a tilting bearing is formed between the reference web and the fastening groove wall, by way of which tilting bearing the casing shell is then brought to bear on the opposite fastening groove wall. A latching fastening, or a fastening acting together with an undercut/notch or embedding on the fastening groove wall, respectively, preferably only takes place at this location on the opposite fastening groove wall with the respective fastening element.

A headpiece of the reference web that is configured as a run-up curve, or with a run-up ramp, respectively, forms an extension of a web region of the reference web that runs parallel to the fastening groove wall and in the profile thereof is curved toward the free end in the direction to the interior of the groove, or to the central axis of the fastening groove base, preferably without any step at the transition between the parallel web region and the curved headpiece. As a result, the reference web on the side that points toward the fastening groove wall is configured so as to be exclusively convex in relation to the fastening groove wall, thus in particular without any concave or undercut regions as in the case of latching webs.

The fastening groove wall that interacts with a reference web preferably does not have any undercuts but is configured planar at a spacing from the groove base, in particular radiused here at the transition to the groove base, preferably having a radius which is smaller than that on the headpiece of the reference web, and furthermore preferably radiused at the upper end of the fastening groove wall, or so as to taper with a chamfer toward the visible face of the profile. When a reference web is used, this configuration of the fastening groove can also be present on the opposite side.

In this way, the casing shell by way of the reference web can be brought to bear on the fastening groove wall using a uniform smooth movement, this resulting in high precision without any effort in terms of force when assembling.

The reference web, on the side that points toward the fastening groove wall as well as on the side that faces away from the fastening groove wall, preferably has a curved profile, in particular wherein the curvature radius on the side facing away is smaller than on the facing side. The reference web in the profile region thereof that is parallel to the fastening groove wall preferably has a constant thickness (when viewed in the cross section perpendicular to the direction of longitudinal extent of the casing shell). Furthermore preferably, the thickness decreases from the beginning of the curved region in the direction toward the free end. In this way, the reduction in thickness is preferably completely only in the headpiece.

The invention can provide that a plurality of fastening elements of the same type and/or of dissimilar type, in particular of the aforementioned fastening elements, can be used in each case. Alternatively, potential connections by press-fitting, clip-fitting or adhesive bonding are also possible solely or in combination with one another.

Fastening elements, in particular those which are provided for the latching fastening and/or for positioning or for adhesive bonding on the fastening groove, can preferably be configured as a pair of fastening elements that are spaced apart in the height direction, the spacing thereof is in particular smaller than or equal to the height of the fastening groove, or smaller than or equal to the spacing of the groove walls of the fastening groove, respectively. Disposed between such a pair of fastening elements, the latter in particular achieving a non-adhesive fastening, can be further fastening elements, for example at least one adhesive foot, in particular at least one further pair of fastening elements that are spaced apart in the height direction, for example one pair of adhesive feet.

In a particularly preferred embodiment, fastening is implemented in each case by way of a mechanical connection, for example latching, contacting, embedding, or at least positioning and an additional adhesive connection.

In one embodiment of the fastening by latching, the core profile preferably has undercuts on the groove walls of the fastening groove, in which undercuts corresponding latching means of the casing shell engage. The undercuts on the mutually opposite groove walls preferably point toward one another. For example, such undercuts can be embodied directly in the material of the respective groove wall, for example on that end of the groove wall that points away from the groove base, where the latter transitions to the non-recessed external wall. An undercut can also be achieved by means of an element which is separate from the groove wall and as a connection partner interacts with a fastening element, for example a latching element, or a contacting/embedding connection element, that utilizes the undercut. Such a connection partner can preferably be fastened to the fastening groove wall, in particular on the inside, so as to point into the groove, preferably having a spacing from the groove base by way of which spacing the undercut is formed. Such a connection partner can be integrally extruded on the groove wall, in particular during the extrusion of the core profile, in particular by co-extrusion. The connection partner that forms the undercut can thus be embodied exactly like the above-mentioned connection partner that by contacting and/or embedding interacts with a further connection element as the fastening element. Said connection partner can likewise be configured in particular from a material of a lesser hardness than the material of the core profile. Said connection partner can be configured from soft PVC, for example.

The undercuts of the core profile preferably run along the entire length of the core profile and can thus be manufactured directly during the extrusion, in particular independently of whether the undercut is implemented in the material of the core profile or a further material.

Accordingly, the fastening means that are configured as latching means of the casing shells are preferably embodied as latching strips, latching webs, etc., which in particular likewise extend across the entire length of the casing shell, in this instance can preferably also be established during extrusion-molding. Such latching strips/latching webs can have latching cams/latching hooks that interact with the undercuts.

Likewise, the adhesive faces of the adhesive feet, apart from the adhesive function thereof, can also perform a latching function and, in particular by way of at least one edge of the adhesive face that points toward the fastening groove wall, engage behind an undercut on the fastening groove wall, said undercut being in particular configured according to the aforementioned embodiments. In this way, an adhesively bonding and latching connection can be established with an adhesive foot of this type.

The latching fastening here is in particular targeted at an at least temporary fastening and/or positioning. The adhesively bonding connection, independently of whether individually or in conjunction with a latching mechanism, preferably achieves a shear resistant/shear resilient combination of a core profile and a casing shell.

All steps explained hereunder describe the production being carried out on the, in particularly long, bar of a plastic hollow-chamber profile as a core profile prior to the latter being tailored for the construction of the frame.

The production takes place by extruding a core profile of plastics material, in particular a hollow-chamber profile having at least one fastening groove in at least one of the two mutually opposite external walls of the core profile, preferably in each of the two mutually opposite external walls of the core profile, in particular by way of which the external wall in the region of the fastening groove is repositioned inwardly into the core profile, and the groove base of said fastening groove has in particular a height which is at least 50%, preferably at least 70%, of the total height of the external wall of the core profile (10, 30), to a predetermined length of, for example, 6.5 meters. The production furthermore takes place by manufacturing at least one casing shell, preferably two casing shells, preferably by extrusion-molding of aluminum, having fastening elements on the internal faces of the casing shell that point toward the core profile, to a predetermined length, in particular of 6.5 meters, and by fastening the at least one casing shell by way of the fastening elements thereof to/in the fastening groove of an external wall of the core profile.

The casing shells, which are preferably configured from aluminum, by means of fastening elements that have latching cams, are preferably initially positioned and fixed on the undercuts on the frame profile (leaf frame profile and/or outer frame profile), for example such that a form-fit is created. The latching connection performs two functions. On the one hand, the casing shell is unequivocally positioned in terms of height by way of two latching points/latching lines that are spaced apart relative to one another, and the correct spacing in terms of the depth to the groove base of the fastening groove of the plastic hollow-chamber profile is guaranteed, on the other hand. The required contact pressure by way of the furthermore utilized adhesive feet with the adhesive is simultaneously generated in this way.

The adhesive feet in comparison to the internal face of the casing shells preferably have a height which is less than the depth of the fastening groove such that space for adhesive remains between the adhesive foot and the groove base.

At the same time, the adhesive feet, which are situated on the internal face of the casing shells, are pressed in a latched position onto the adhesive, the latter after or during the extrusion process having been applied in adhesive tracks across the entire length to the groove base of the fastening groove, such that a materially integral fit is created. The type of adhesive bond, for example hotmelt, bicomponent adhesive bonding, or other types, is selected depending on the material and costs. The core profile, for example in the form of a plastic hollow-chamber profile, is in this way fixedly connected to the casing shells on the inside of the building as well as on the outside of the building. As has been mentioned above, the adhesive feet per se can also configure latching fastening elements. In this instance, latching elements which are separate from adhesive feet can also be dispensed with.

An alternative lies in that casing shells on the internal face that points toward the core profile/plastic hollow-chamber profile, instead of the latching feet, have the mentioned positioning webs which in the longitudinal direction of the shells extend across the entire length of the latter and serve only for positioning during adhesive bonding. The positioning webs can be guided by the groove walls during positioning. This has the advantage that no forces are required for the latching mechanism of the casing shell during the adhesive bonding process. In this instance, the adhesive forms a materially integral connection.

As has already been mentioned in the context of the construction, it can also be provided that during the extrusion of the core profile from plastics material, in particular uPVC, having at least one fastening groove, preferably two fastening grooves, in at least one of the fastening grooves, preferably in both fastening grooves, a connection partner is integrally extruded on at least one of the two fastening groove walls so as to point toward the interior of the groove, said connection partner being from a material which is softer than the material of the core profile, in particular a connection partner from soft PVC is integrally extruded, and when fastening a casing shell at least one of the fastening elements of the latter, is brought to bear in a contacting manner on the connection partner and/or is embedded in the connection partner, in particular as a result of the material displacement generated by the fastening element in the connection partner.

The casing shells, preferably at least those on the outside of the building, on at least one of the edges that run in the longitudinal direction, in particular the edge which in the later install position of the frame is the upper edge, preferably have an angled collar; in particular, said casing shells in this way are configured so as to be L-shaped on the edge. Preferably, this collar, furthermore preferably the end face of the collar, bears in a contacting manner on a seal inserted in the core profile. In this way, the casing shells at the upper end thereof can encompass the outer frame and/or leaf frame and protect said frames in relation to damp which ingresses between the casing shell and the core profile.

The encompassing takes place in particular such that the collar end face that in the leaf frame profile points toward the windowpane, or in the outer frame profile points toward the leaf frame profile, externally contacts a seal by way of which the leaf frame borders the windowpane, or by way of which the outer frame is sealed in relation to the leaf frame. Furthermore preferably, the seal can externally have a planar face at the height level of the collar end face such that the collar and the seal in terms of height are mutually aligned at the transition.

All detent regions between the leaf frame and the outer frame are preferably provided with seals. Standard seals, which reliably avoid any ingress of water into the region between the aluminum casing shell and the plastic profile, can be used. In the preferred embodiment, a glass strip which is clip-fitted and is preferably from the same material as the casing shell, preferably from aluminum, forms the enclosure and the counter bearing of the glass insert on the inside of the building. The semi-finished product, which is capable of being processed, preferably cures during the first 24 hours.

Particularly with a view to advantageously manufacturing a corner connection between two frame profiles, the invention can furthermore provide that the casing shell is disposed externally on the core profile completely in front of the plane in which the groove base of the fastening groove lies. In this preferred embodiment, the casing shell thus does not penetrate this plane of the groove base by way of any of the regions of said casing shell, in particular also not by way of an angled collar.

The plane in which the groove base lies is always to be understood to be at least such a plane which runs within the base thickness of the groove base and is parallel to the alignment of said groove base, in particular parallel to the surface of said groove base. When viewed from the outside, material of the groove base may thus lie in front of, in and behind the groove base plane.

The plane in which the groove base lies is preferably understood to be the plane in which the outwardly pointing surface of the groove base lies, in particular thus the groove base face which can be seen by an outside observer. In the case of this definition, when viewed from the outside, material of the groove base may still lie behind and in the groove base plane. In the case of this definition however, there is no material of the groove base on the outside in front of the groove base plane.

The respective casing shell is furthermore preferably of a single wall configuration, said respective casing shell in particular does not comprise any hollow chambers.

The frame profile according to the invention, in terms of the overall width thereof relating to the cross section of the profile in the width direction between the inside of the room and the external side, furthermore preferably corresponds to the standard dimensions. The pure core profile, in particular plastic hollow-chamber profile, that forms the core is thus reduced in width in comparison to the standard dimensions. The casing shells, which are preferably made of aluminum, form the new visible faces toward the inside as well as toward the outside. The visual impact of a complete window or a door in the material of the casing shells has been created, without causing any cladding and unnecessary material thicknesses or double layers. A stable leaf/frame system which is optimized in terms of material has been created.

The invention will be explained in more detail hereunder with reference to the drawings.

Figure 5:
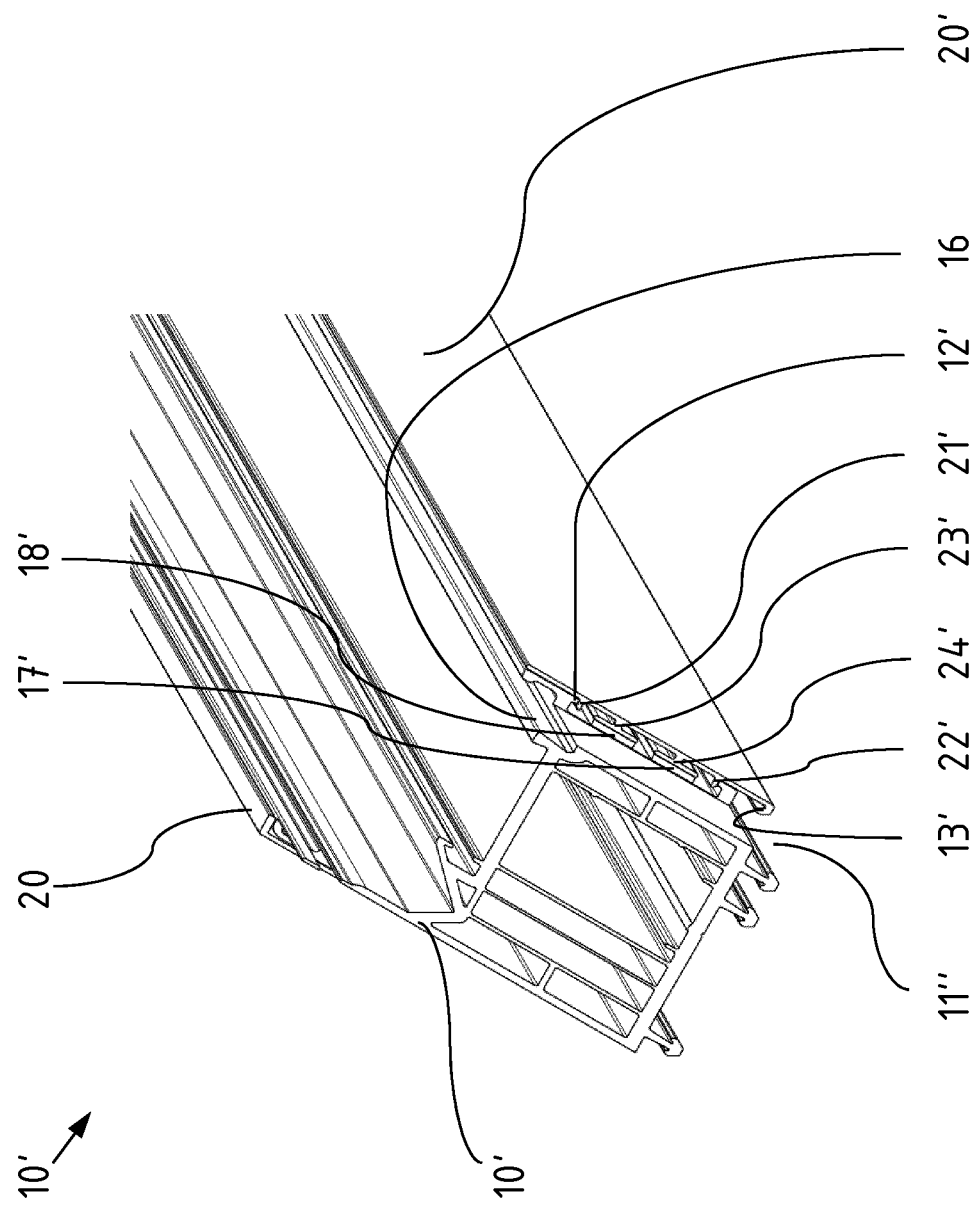
Figure 5A:
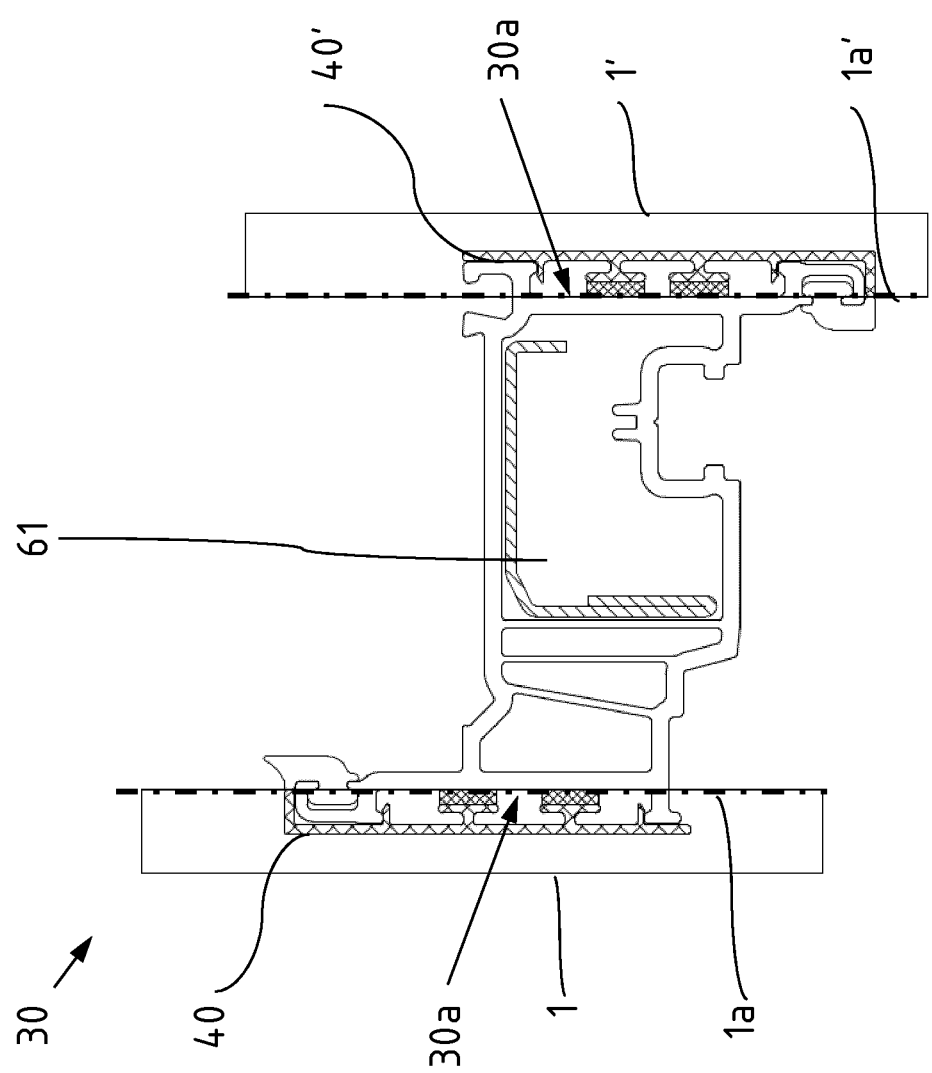
Figure 5B:
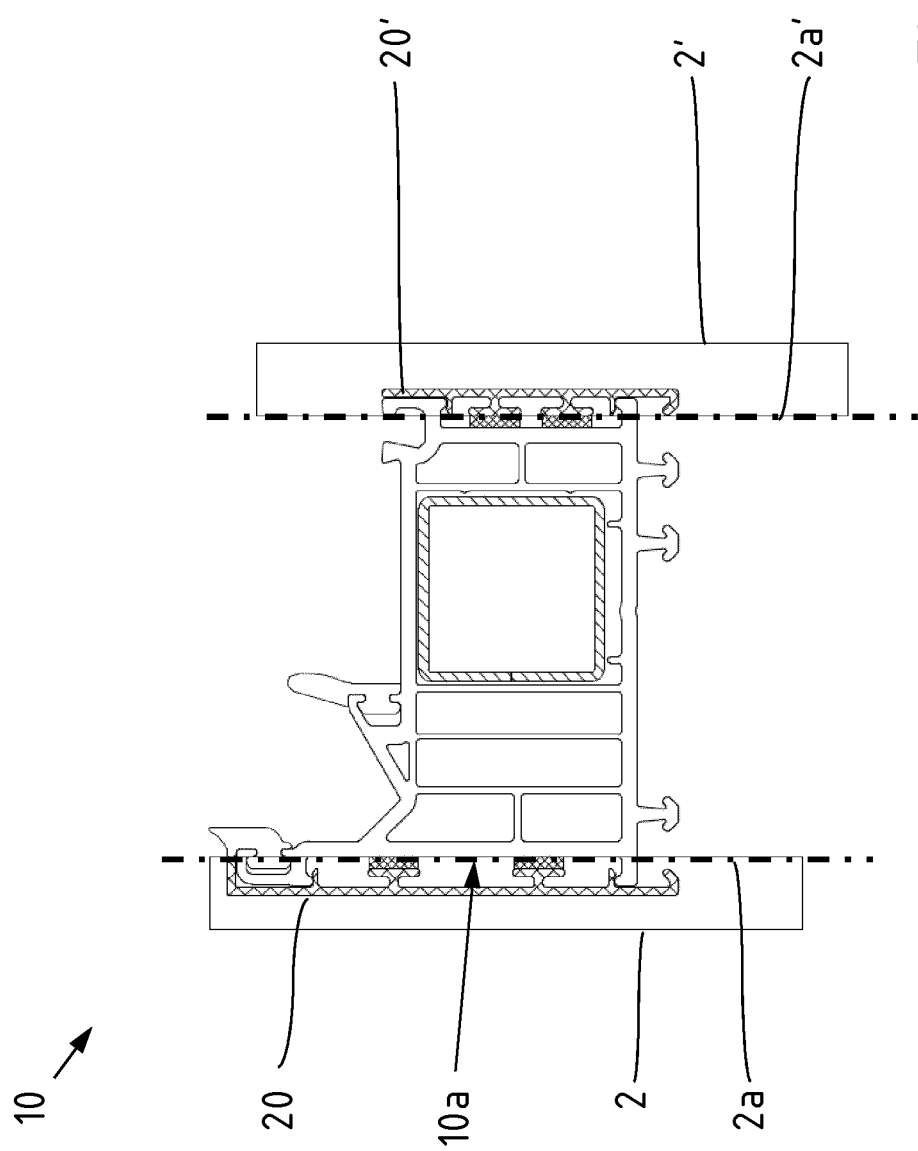
Figure 6:
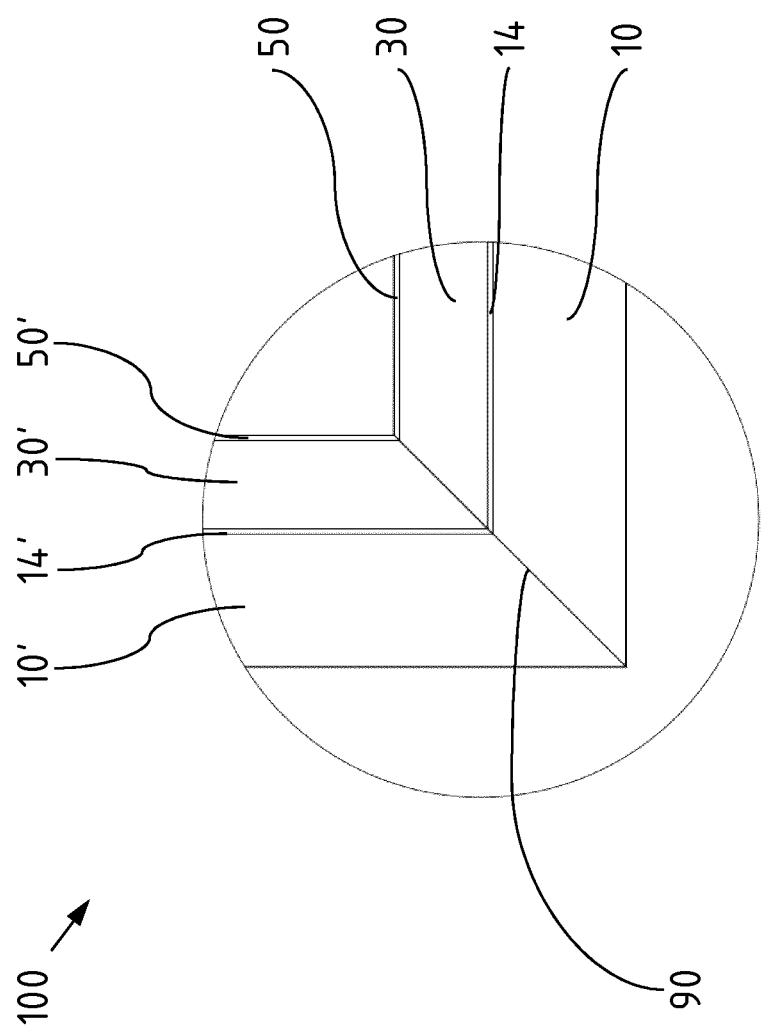

FIGS. 4*a*-4*h* illustrate further embodiments of outer frames and leaf frames, upright post profiles and casement profiles from frame profiles according to the invention in the cross section;

FIG. 5 illustrates a perspective view of the outer frame profile according to the invention, having machined casing shells with miter cuts;

FIG. 5*a* illustrates the leaf frame profile according to the invention, having the machined region, in the cross section;

FIG. 5*b* illustrates the outer frame profile according to the invention, having the machined region, in the cross section; and FIG. 6 illustrates a detailed view of a corner connection of two frame profiles according to the invention, when viewed from the outside of the building.

Figure 1:
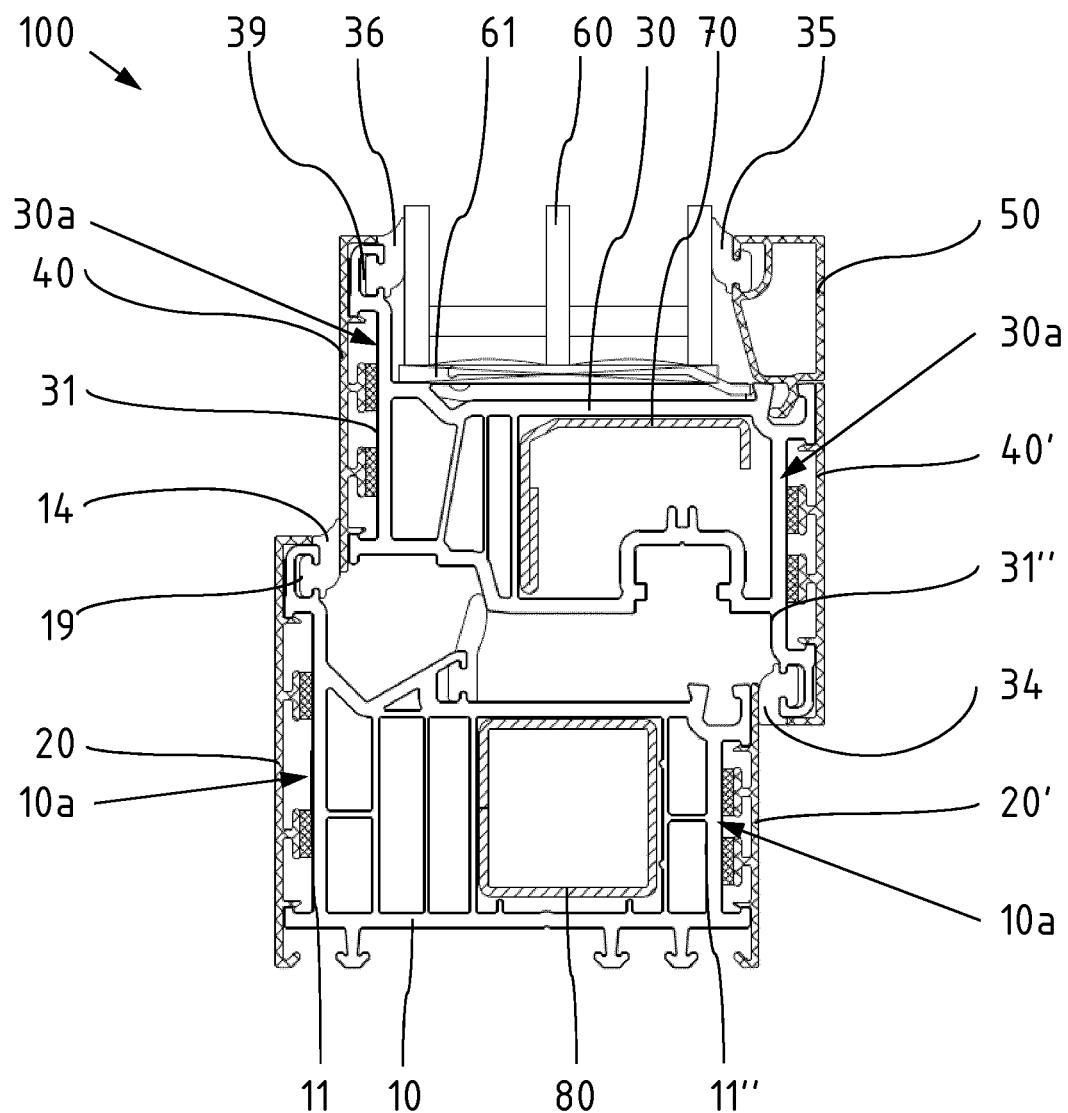
FIG. 1 shows a combination of an outer frame and a leaf frame from frame profiles according to the invention, having steel reinforcements in the outer frame and in the leaf frame, in the closed window position, in the cross section.

Illustrated in FIG. 1 is a combination of an outer frame and a leaf frame from frame profiles according to the invention, having steel reinforcements in the outer frame and in the leaf frame, in the cross section in the closed window position. Formed as a result is a leaf/frame system 100 which comprises a leaf frame profile 30 as a core profile, and an outer frame profile 10 as a core profile, each in particular made from plastic hollow-chamber profiles. Both profiles 10, 30 have in each case at least one steel reinforcement 80, 70. The leaf frame is movably connected to the outer frame and in the glass rebate 61 of the leaf frame profile 30 offers space for receiving a glass insert 60. Two sealing strands 14, 34 are disposed between the leaf frame profile 30 and the outer frame profile 10, and one sealing strand 36 is disposed on the leaf frame profile 30, said sealing strands 14, 34, 36 preferably being co-extruded.

The cross-sectional width in relation to the construction depth (when viewed between the outside of the building and the inside of the room) of the outer frame profile 10 is preferably 82 mm but can also be applied to further construction depths such that said outer frame profile 10 can be integrated in existing standard frame programs of a manufacturer.

All delimiting dimensions of a leaf/frame system 100 from frame profiles according to the invention represent existing leaf systems. The external visible faces of the leaf frame profile 30 and of the outer frame profile 10 are configured by casing shells 20, 40, 20', 40', and are a component part of the combined profile construction from the respective leaf frame core profile and the casing shell profile, or the outer frame core profile and the casing shell profile, respectively. This invention is not a cladding which uses panels and is characterized by a double layers.

The shape of the profile system 100 for the leaf frame as well as for the outer frame is distinguished in that the perpendicularly running core profile external walls on the outside of the building and the inside of the room are at least in regions offset toward the interior of the profile, but preferably form the thickest walls, the latter by way of their characteristics forming the structural functional webs 11, 11", 31, 31". Configured as a result of the offset is a fastening groove 10*a*, 30*a* on the external wall of the respective core profile 10, 30, the groove base of said fastening groove 10*a*, 30*a* being formed by the functional webs 11, 11", 31, 31".

The offset of the functional webs 11, 11", 31, 31", or the groove depth, respectively, is preferably conceived with a view to the dimension by way of which the adhesive feet, including the application of adhesive, project in the direction toward the core profiles from the interior faces of the casing shells that point toward the core profiles, said dimension thus being required in particular for designing the latching and adhesive connections to the casing shell 20, 20', 40, 40'.

The structural design of the casing shells 20, 20', 40, 40' takes place so as to consider costs according to minimized-material points of view. All functional requirements are implemented in the supporting, single-wall and flat embodiment of the casing shell 20, 20', 40, 40'. The casing shells 20, 40 which are disposed on the outside of the building are angled at the upper end thereof when viewed in the section so as to form a collar that points in the direction toward the interior of the profile, or toward the opposite external wall, respectively, and are thus L-shaped. In this way, said casing shells 20, 40 can encompass the seal receptacle groove 19, 39 on the outer frame and the leaf frame, so as to prevent the ingress of damp between the casing shells 20, 40 and the functional webs 11, 31. The collar end faces here preferably contact the respective seal 14, 36, in particular on the seal end face thereof that points toward the outside of the building.

In this way, the casing shells 20, 40 by way of their surface preferably form a flush connection to the detent seals 14, 36, the latter in the closed window position in turn sealing the gap in relation to the leaf frame, or to the glass insert 60, respectively. On the inside of the building, the casing shells 20', 40' are embodied so as to be I-shaped at the upper end and terminate flush with the upper ends of the glass strip grooves 16, 38.

Figure 2:
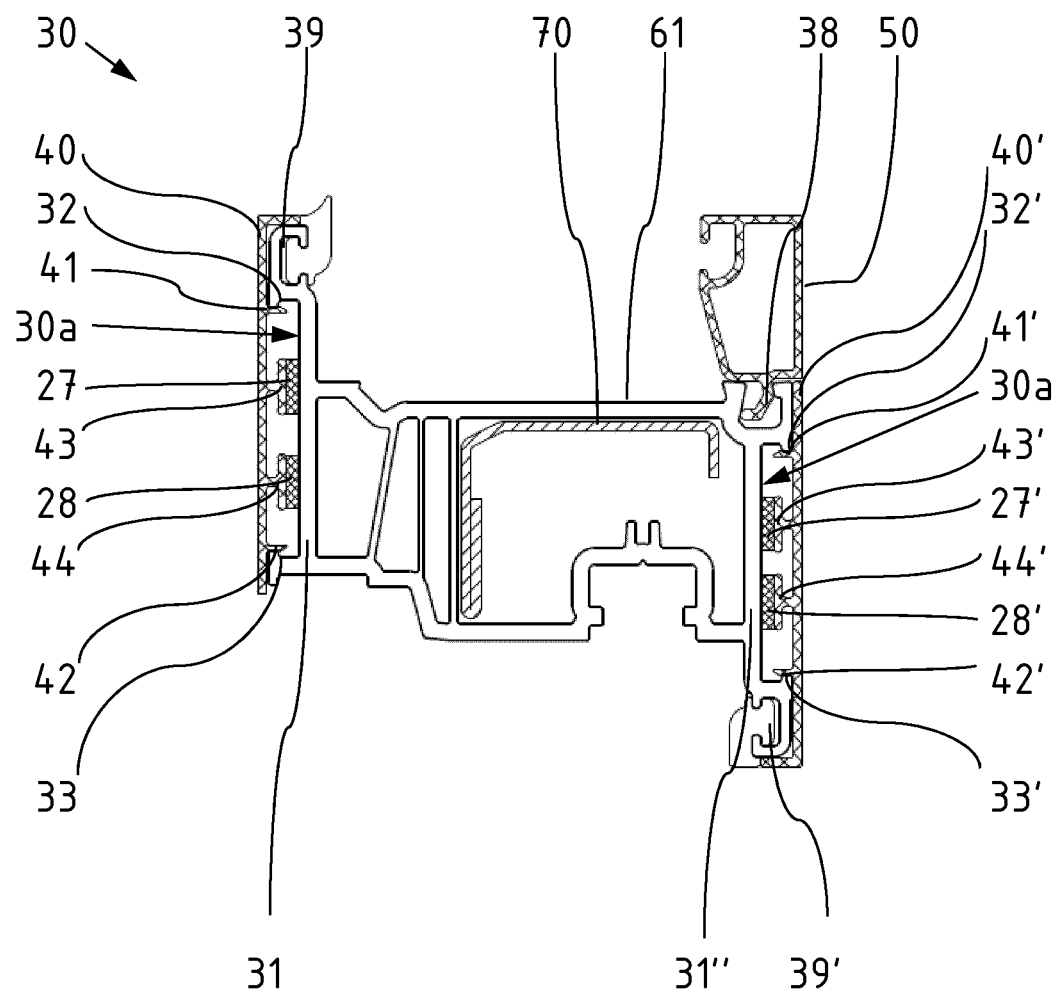
FIG. 2 illustrates the leaf frame profile according to the invention, having a steel reinforcement, in the cross section.

FIG. 2 illustrates the leaf frame according to the invention, having a steel reinforcement, in the cross section. The two latching cams 41, 42, 41', 42' of the casing shells 40, 40', that are provided as fastening elements and in the longitudinal direction extend across the entire length of the casing shells, on the outside of the building and the inside of the building engage in the undercuts 32, 33, 32', 33' of the leaf frame 30. These undercuts are disposed on the ends of the groove walls of the fastening groove 30*a*. The casing shells 40, 40', the latter being distinguished in particular by a flat construction mode with a minor depth, are positioned and fixed in a form-fitting and/or force-fitting manner by way of this latching mechanism.

Alternatively, but not shown here, straight or tapering webs, which cause the casing shell to be positioned relative to the fastening groove walls, can be provided instead of the latching webs.

The upper end of the casing shells 40 on the outside of the building, by way of a collar which is angled toward the interior of the profile, encompasses in the shape of an L the functional web/groove base 31 of the leaf frame profile 30, said functional web/groove base 31 at the upper end thereof beyond/above the fastening groove wall being shaped so as to form the seal receptacle groove 39. The lower end of the casing shells 40 runs out in a straight manner, preferably with an overlap in relation to the leaf frame profile 30. The casing shells 40' on the inside of the building, by way of a collar which is angled toward the interior of the profile, at the lower end encompass in the shape of an L the functional web/groove base 31 of the leaf frame profile 30, said functional web/groove base 31 being shaped so as to form the seal receptacle groove 39', and at the upper end terminates flush at the height level of the upper edge of the glass strip groove 38. The glass strip 50 is clip-fitted in said glass strip groove 38. The respective collar end faces here also preferably contact the seals, in particular in those seal grooves which are in regions surrounded by the collars.

The adhesive feet, which as further fastening elements are integrally molded on the rear of the casing shells 20, 40, and on that side of the casing shell that faces away from the visible face of the casing shells, thus on the internal face of the casing shell that faces the core profile, are disposed between the latching cams 41, 42, 41', 42' (alternatively the positioning webs). The adhesive feet have an end adhesive application face which is spaced apart parallel to the fastening groove base and from the latter by the thickness of the adhesive. The adhesive feet in this example are configured so as to be T-shaped.

As soon as the casing shells 20, 40 have been positioned and preferably latched, the required contact pressure by way of the adhesive feet simultaneously acts on the adhesive strand which has been applied to the functional webs 31, 31", the latter forming the fastening groove base. A materially integral connection has been formed. The profiles are held in position by the mechanical latching mechanism. A non-releasable, materially integral connection among the profiles is created after the complete curing of the adhesive 27, 28, 27', 28', preferably after 24 hours at the latest.

Figure 3:
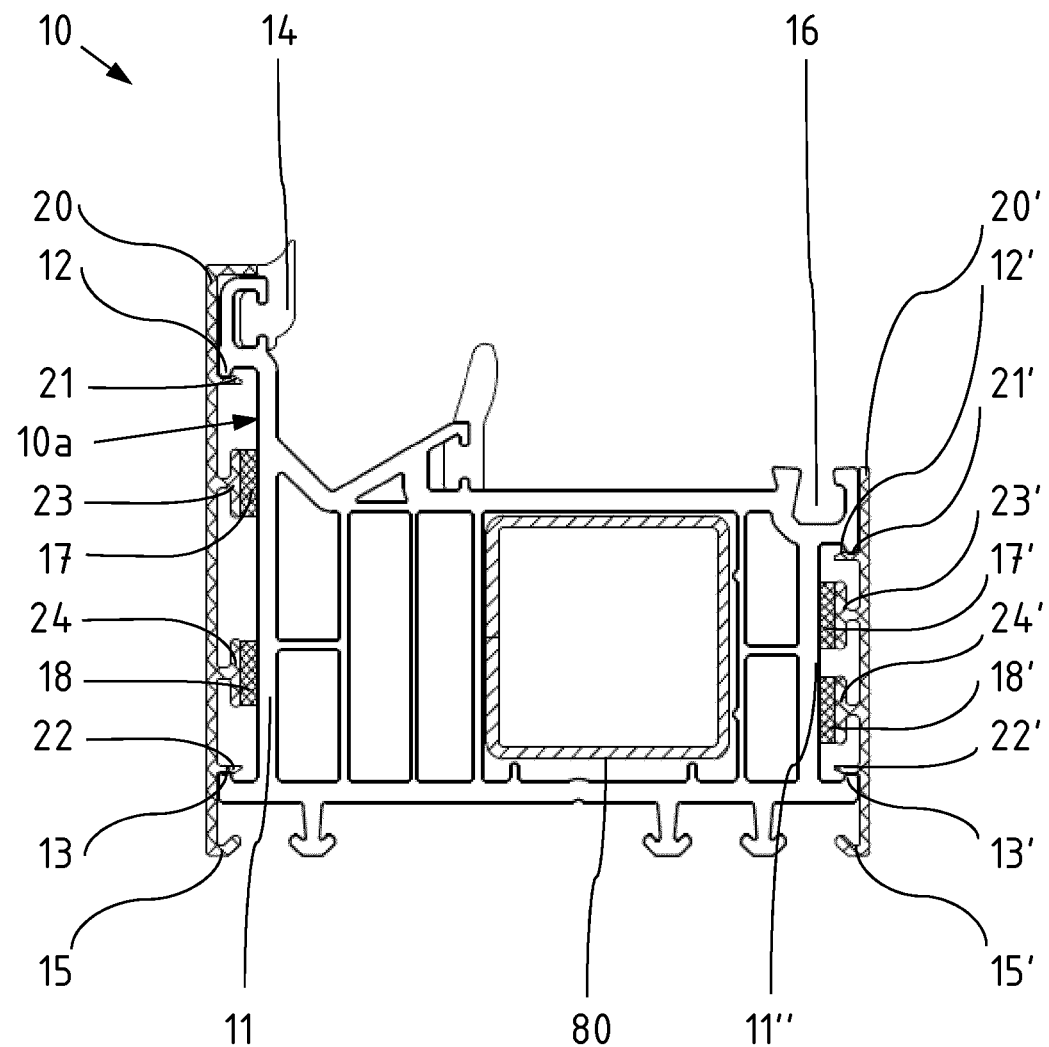
FIG. 3 illustrates the outer frame profile according to the invention, having a steel reinforcement, in the cross section.

FIG. 3 illustrates the outer frame profile according to the invention, having a steel reinforcement, in the cross section. The constructive design of the casing shell 20 on the outside of the building is comparable to the embodiment for the leaf frame profile 30 according to FIG. 2, and in terms of the latching cams 21, 22 disposed in pairs with a connection to the undercuts 12, 13 in the plastic hollow profile, as well as the adhesive feet 17, 18, 17', 18' present in pairs and integrally molded between the latching cams. However, the casing shell 20 has a larger overall height in comparison to the casing shell 40, and at the lower end is angled in the direction toward the interior of the profile, in particular shaped so as to form only preferably half an outer frame foot 15. The casing shell 20' on the inside of the building, by way of the upper end, terminates flush with the enclosing web of the glass groove 16 and at the lower end is angled in the direction toward the interior of the profile, in particular shaped so as to form only preferably half an outer frame foot 15'.

In the embodiments illustrated, preferably in all potential embodiments of the invention, all casing shells 20, 20', 40, 40' are of a single-wall shape, meaning that said casing shells 20, 20', 40, 40' do not have any closed cavities when viewed in the cross section.

Figure 4:
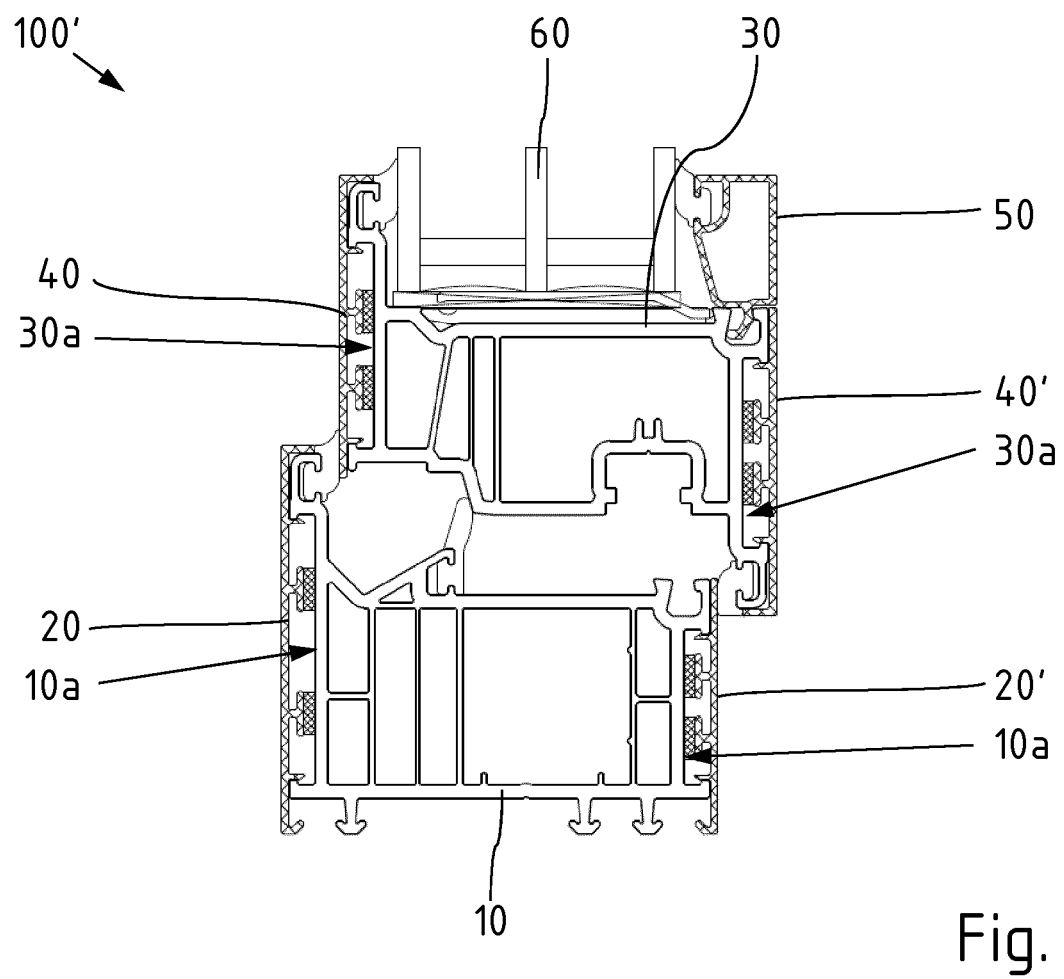
FIG. 4 illustrates an embodiment of an outer frame and a leaf frame from frame profiles according to the invention, without steel reinforcements, in the cross section.

FIG. 4 illustrates an embodiment of the leaf/frame system according to the invention, without steel reinforcements in the outer frame profile and in the leaf frame profile, in the cross section. This variant highlights that the leaf/frame system is inherently stable and does not necessarily require a steel reinforcement. The respective core profile 10, 30 having the functional webs/groove bases 11, 11", 31, 31", which are preferably the thickest webs of the hollow-chamber profiles, are structural, and the casing shells 20, 20', 40, 40' impart to the profile system such a high degree of stability that additional steel reinforcements can be dispensed with.

Figure 4A:
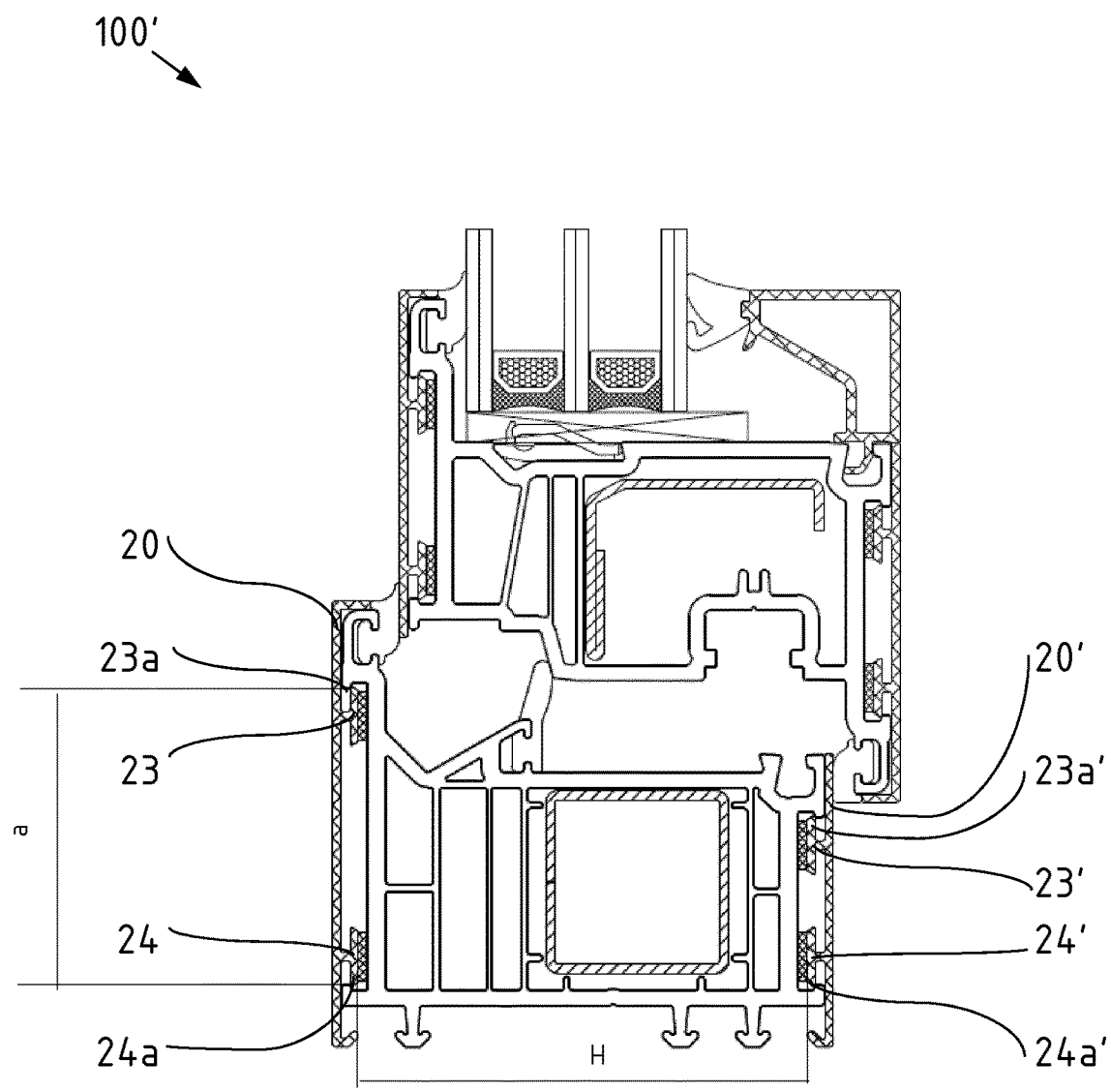

FIG. 4a illustrates a further embodiment of the leaf/frame system according to the invention. Here, the adhesive feet 23, 24, by way of the shaping so as to form latching protrusions 23a, 24a on the free ends thereof that in particular point away from one another in the height direction, assume not only the function of an adhesive face pointing toward the core profile 10, 30, but are also suitable for latching with the undercuts of the core profile 10, 30 on the fastening groove walls. The latching webs 21, 22 according to FIGS. 1 to 4 can be dispensed with in this variant. The adhesive feet 23, 24 move further apart. The spacing a of the latching protrusions 23a, 24a preferably corresponds to the dimension of the outer demarcations of the groove base of the fastening groove 10a in the height direction.

A larger mutual spacing a of the adhesive feet 23, 24, which is able to be achieved in particular by the great groove base height in comparison to the overall external wall, has the effect of a higher moment of inertia about the x-axis and leads to an increase in terms of the shear resistance and shear resilience.

In combination with the additional adhesive bonding, a materially integral shear coupling is achieved on the adhesive faces, this additionally increasing the stability of the frame system.

Resulting from the spacing and the disposal of the casing shells (20, 20', 40, 40') on both sides, and from the large mutual spacing H of the respective centers of gravity of the casing shells, apart from the individual area moment of inertia of the respective shell as a result of the shear-resistant coupling having an ideally high shear resistance/shear resilience, is a significantly higher overall area moment of inertia as a result of the respective proportions according to Steiner's theorem. As opposed to adding the pure individual moments of inertia, a significantly higher flexural stiffness can be achieved as a result, and the combination system offers a higher resistance in relation to wind and temperature loads, for example. It is the objective of the materially integral adhesive bond to achieve an ideally high degree of efficiency of the shear coupling. The size of the adhesive faces and of the adhesive feet, and the mutual spacing thereof, have the effect of a particularly stable shear coupling which, when interacting with the outer, enclosing aluminum casing shells 20, 20', 40, 40', generate a high moment of inertia and a very good transverse tensile strength.

The fastening groove walls in the further FIGS. 4b to 4h are not provided with undercuts, as opposed to the other embodiments described.

Figure 4B:
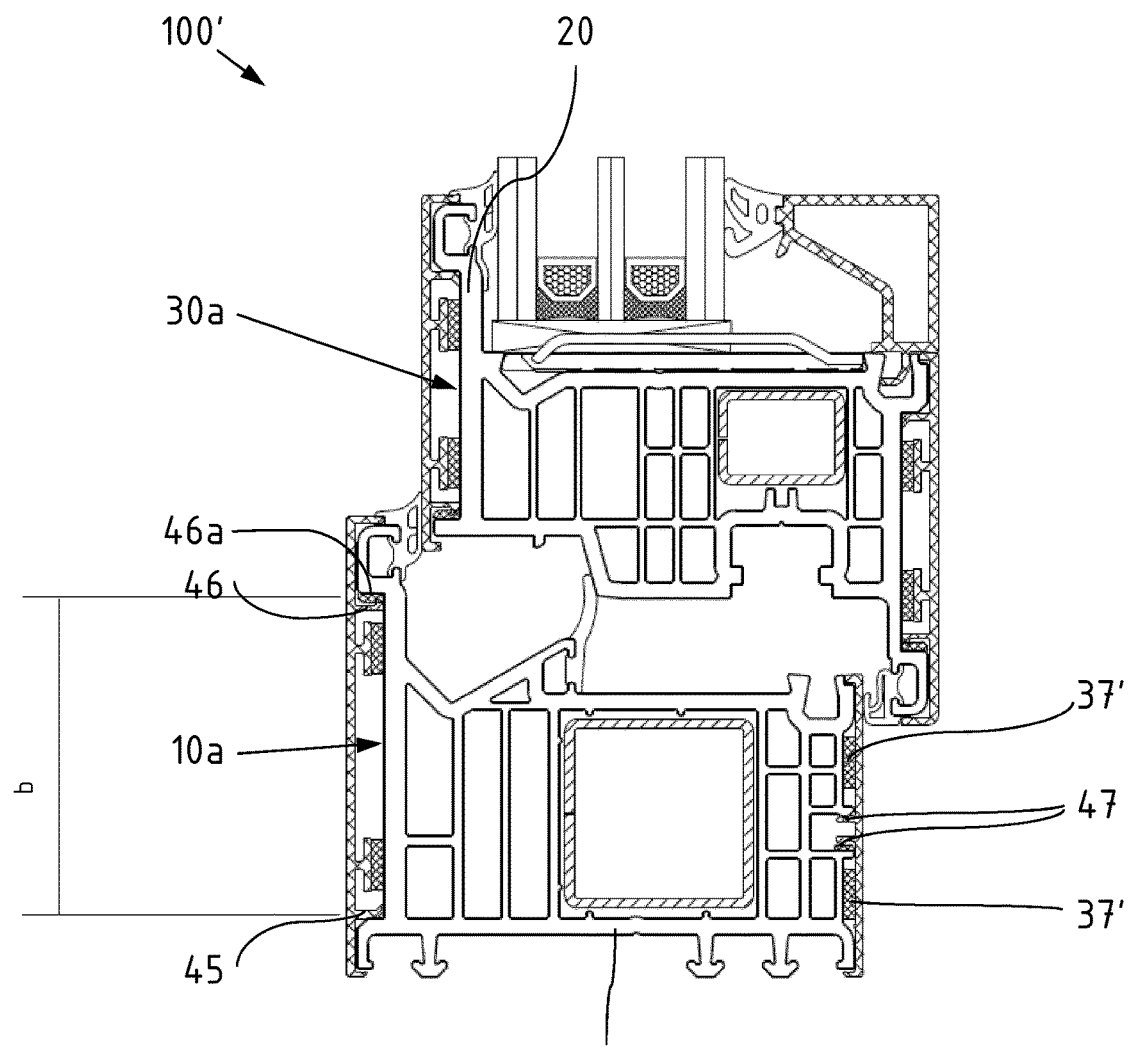

FIG. 4b and FIG. 4bb show a further embodiment in terms of the connection elements 45, 46 of the casing shells 20, 20', 40, 40'.

The casing shells 20, 20', 40, 40' in these variants have the following fastening elements: adhesive feet 23, 24, reference web 45, wedge web 46 and centering webs 47.

The reference web 45 forms the thickest web of the connection elements 45, 46 and possesses a slightly radiused end as an insertion radius or run-up ramp/run-up curve, respectively, and serves as a detent in the corner of the fastening groove 10a and functions as a spacer in relation to the vertically running groove base.

The reference web 45 is the reference point for the primary positioning of the casing shells 20, 40, 40' and is releasably connected to the core profile 10, 30 by virtue of being able to be clamped, or in a friction-fitting manner. Said reference web 45 functions as a reference point and alignment point for adjusting the casing shells 20, 40, 40'. The reference web 45 establishes the position of the casing shells 20, 40, 40' in the x-axis and the y-axis.

The positioning of the casing shells takes place by attaching them in parallel to the core profile 10, 30. The two fastening elements 45, 46 protrude farthest from the casing shell in the direction of the core profile 10, 30, and serve also as guide elements which are disposed at the mutual spacing b. The spacing b defines the largest possible spacing of the connection elements 45, 46 within the fastening groove 10a. The fastening element corresponds to a web having a wedge-shaped headpiece, the latter having a wedge nose which is directed toward the groove wall. The fastening element 46 has the same length as the reference web 45, and as a second web ensures the parallelism of the casing shells 20, 40, 40' in relation to the groove base 10a, 30a.

The fastening element 46 has a thinner cross section in comparison to the reference web 45, and on the free end has a projecting wedge nose 46a which in this embodiment of the core profile 10, 30 from PVC does not latch in an undercut provided to this end. When assembling the casing shell 20, 40, 40' with the core profile 10, 30 under pressure, the hard casing shell of aluminum deforms the softer PVC material in such a manner that a wedge joint is formed between the casing shell and the core profile.

Aluminum is harder and stronger in comparison to PVC. The wedge nose 46a of aluminum, which projects in the direction toward the groove wall, is impressed into the softer PVC material, this leading to a targeted modification of the shape in the form of a notch in the PVC, the wedge nose 46a sinking into said notch and interlocking therein.

Illustrated in FIG. 4bb is a variant in which the core profile 10, 30 on the here upper groove wall is provided with an integrally extruded soft PVC material 46b as the connection partner for the fastening element 46. Owing to the elastic behavior thereof, said soft PVC is ideally suited as the connection partner for the wedge nose 46a so as to establish a connection between the casing shell 20, 20', 40, 40' and the core profile even under a comparatively minor pressure. As a result of pressing and/or impressing and/or embedding the connection element 46, 46', the material in the connection partner 46a is displaced so as to correspond to the geometric shape of the connection element and leads to a force-fitting and/or form-fitting and/or friction-fitting connection. The material retains its mass and its cohesion. In this embodiment, only the functional headpiece, the wedge nose 46a, can engage in the connection partner and the web region of the connection element can be without contact therewith. It can also be provided that the web at least contacts the connection partner, or else is embedded in the latter. Other shapes of the headpiece can likewise be provided.

Soft PVC contains phthalates which lead to an elastic behavior of the PVC material. Soft PVC 46a is soft to the touch and more elastic than uPVC from which the core profile is preferably made. The detent seal 14 is likewise composed of soft PVC and is separately integrally extruded thereon during the extrusion procedure. Soft PVC 46b on the casing shell 20 additionally seals in relation to water, which ingresses, behind the casing shell 20.

Further advantages of this type of connection lie in the compensation of tolerances. The elastic soft PVC 46b is incorporated between the core profile 10, 30 and the casing shell 20, 20', 40, 40' and is capable of compensating the tolerances of the adjacent join parts.

The casing shells 20, 20', 40, 40' and the core profiles 10, 30 are in each case connected by way of the two connection webs, which form the connection regions between the shell and the core, and engage in the two end regions of the fastening groove 10a, 30a. A desired clamping effect is created as a result of the groove being demarcated in terms of construction.

The fixed connection is achieved by the displacement of material in the PVC material of the core profile, or of the connection partner, respectively, as a female mold of the wedge nose 46a, on the one hand, and by the geometry of the wedge nose 46a, the latter functioning like a barb, on the other hand.

The connection web 46, 46' can also be shaped in any other arbitrary manner. Any geometric contour which has enlarging moldings that reach into the connection material and can physically displace the latter is suitable. Even a web having a flat surface can displace material in that the former is pressed onto the softer material, and achieve a friction-fitting connection with an increased clamping effect.

Both variants according to FIGS. 4b and 4bb enable the casing shell 40, 40', 20, 20' to be adjusted by way of connection elements 45, 46, 47, the latter guaranteeing unequivocal and precise fixing of the casing shells 40, 40', 20, 20' during the initial assembly while compensating tolerances in the y-direction.

Additionally used is a shapeless substance, specifically adhesive 27, 28, which is applied between the adhesive feet 23, 24 and the groove base 10a. This substantial connection takes place in a materially integral manner by way of two adhesive strands 37 which extend in the cavities below the casing shell 20'. In this way, a materially integral connection in the material per se is established, which forms a shear coupling and imparts to the profile system deformation resistance and stability.

Figure 4C:
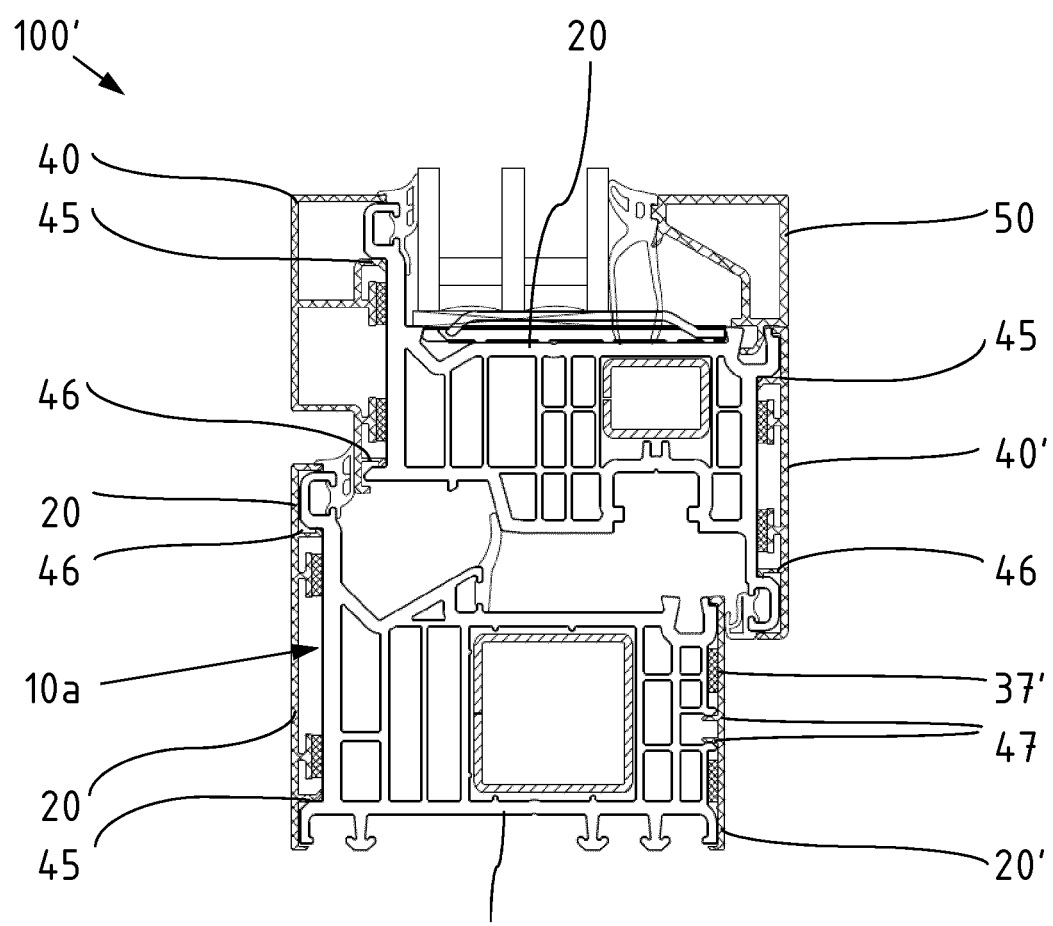
Figure 4C:
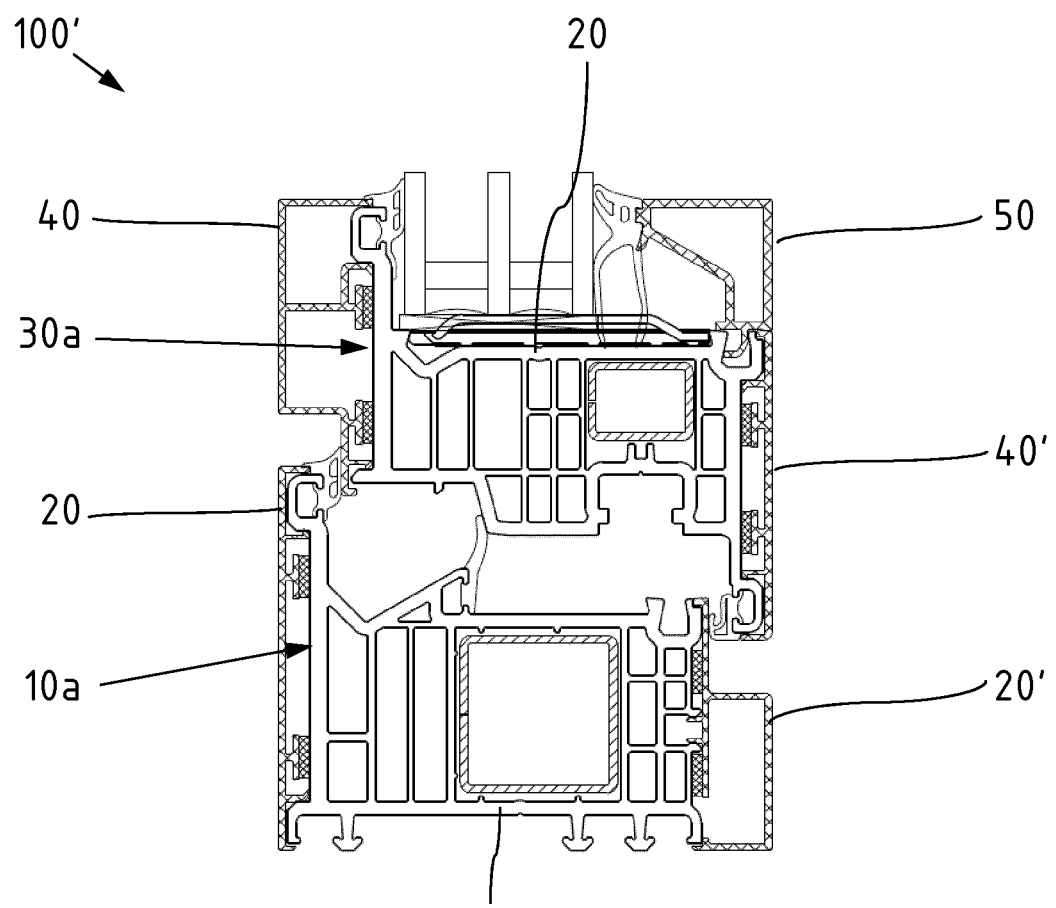
Figure 4D:
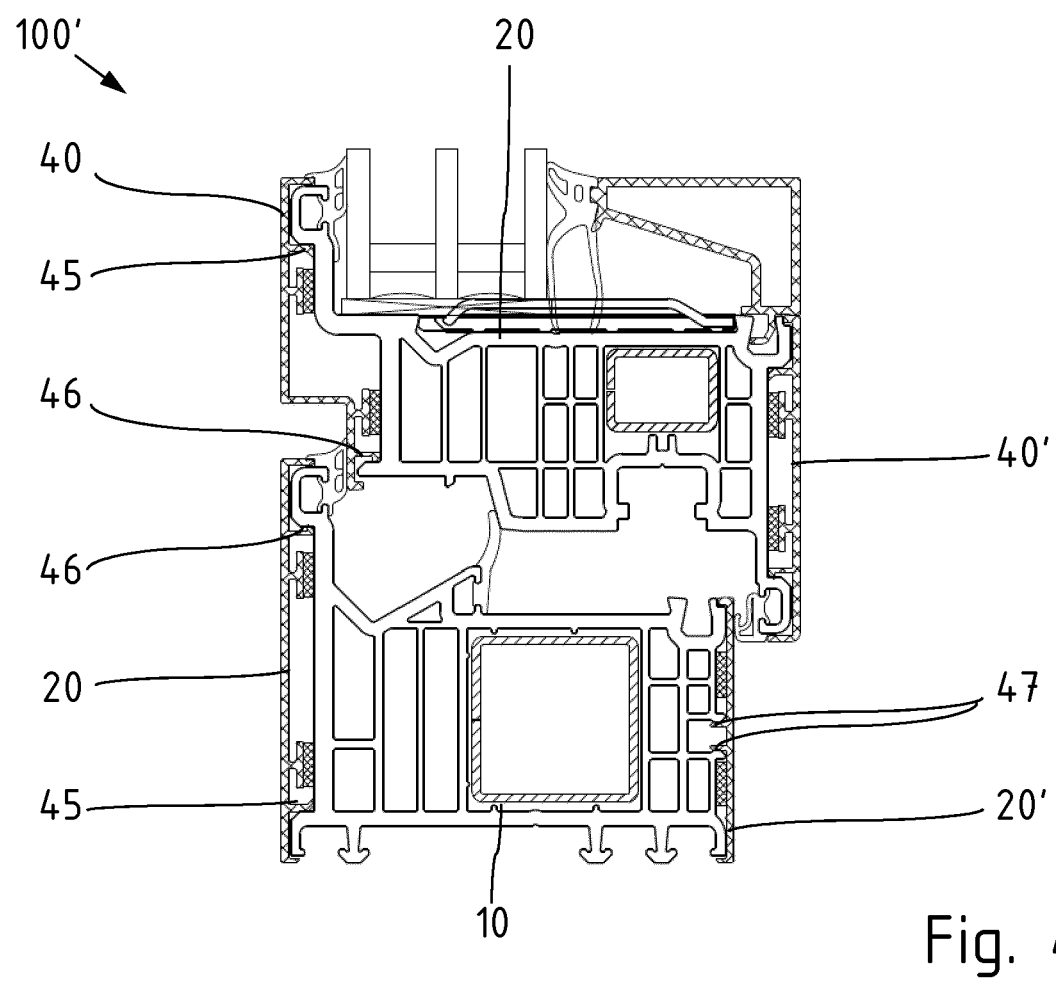
Figure 4D:
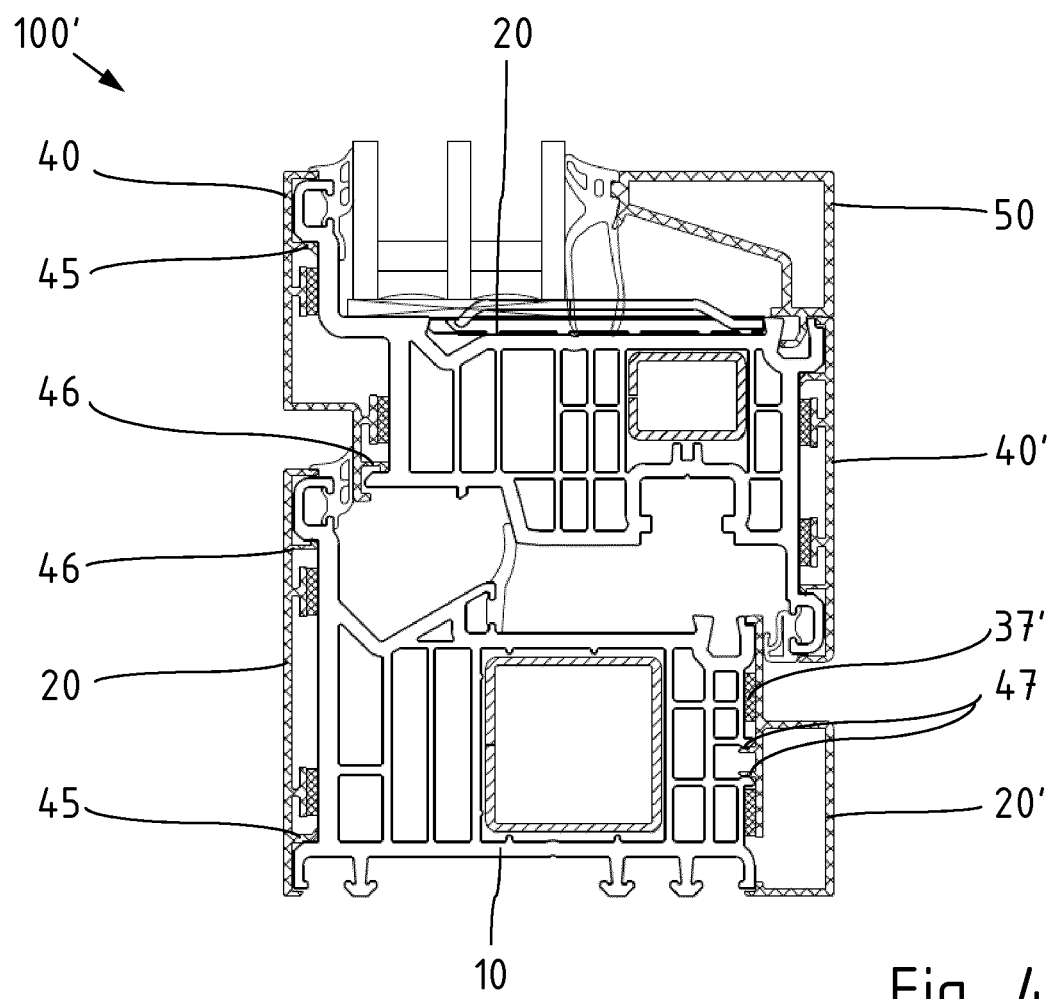
Figure 4E:
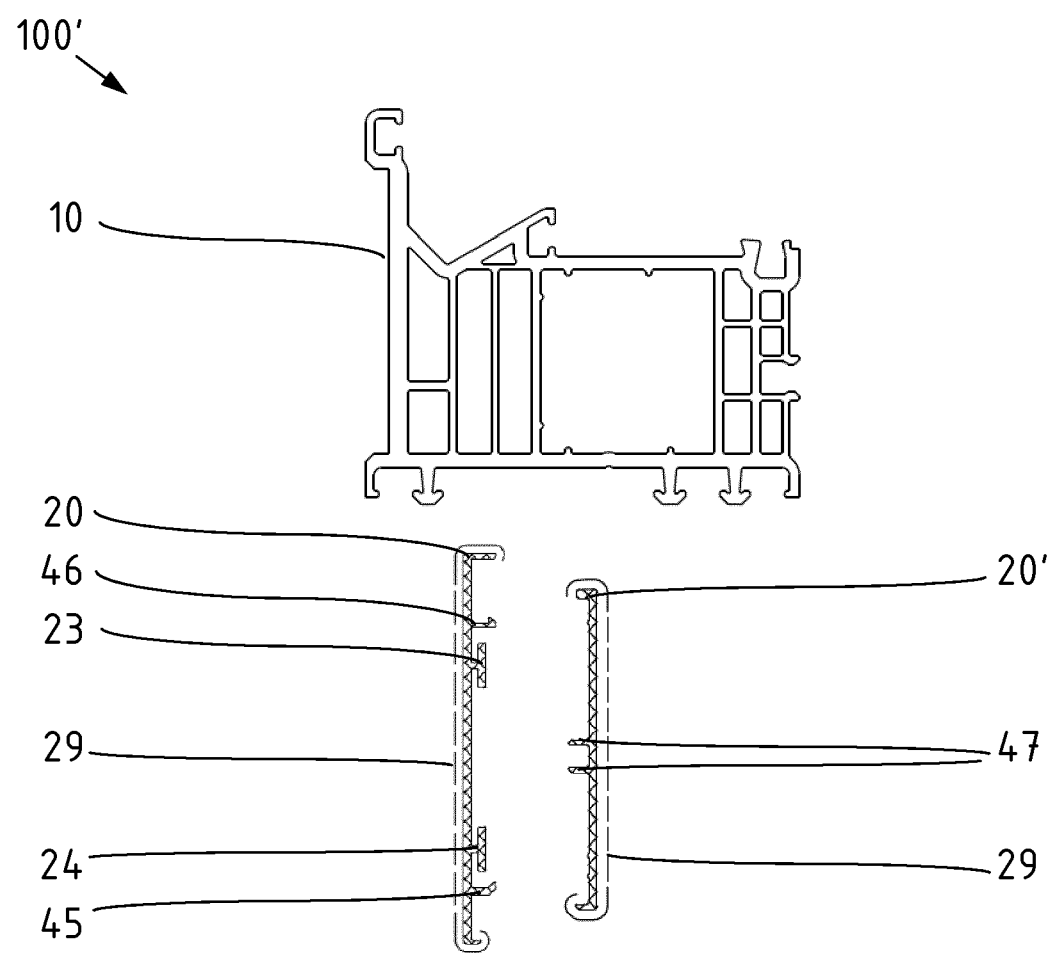

This variant, just like the following embodiments according to FIGS. 4c-4dd, are based on this fastening principle which is distinguished by at least four casing shells 20, 20', 40, 40', having in each case at least two spaced-apart adhesive feet 23, 24, and by adhesive bonding using dimensionally stable casing shells from aluminum achieves a shear coupling which represents a statically stable and load-bearing profile system by way of which even large window elements can be constructed.

FIGS. 4c and 4d depict embodiments having a weather side which has flush faces and in which the casing shells 40, 20 on the external side, here the left external side, are disposed so as to be mutually aligned.

FIGS. 4cc and 4dd show embodiments having casing shells 40, 40', 20, 20' which have flush faces on both sides and which are disposed so as to be mutually aligned, both on the weather side as well as on the room side.

Figure 4F:
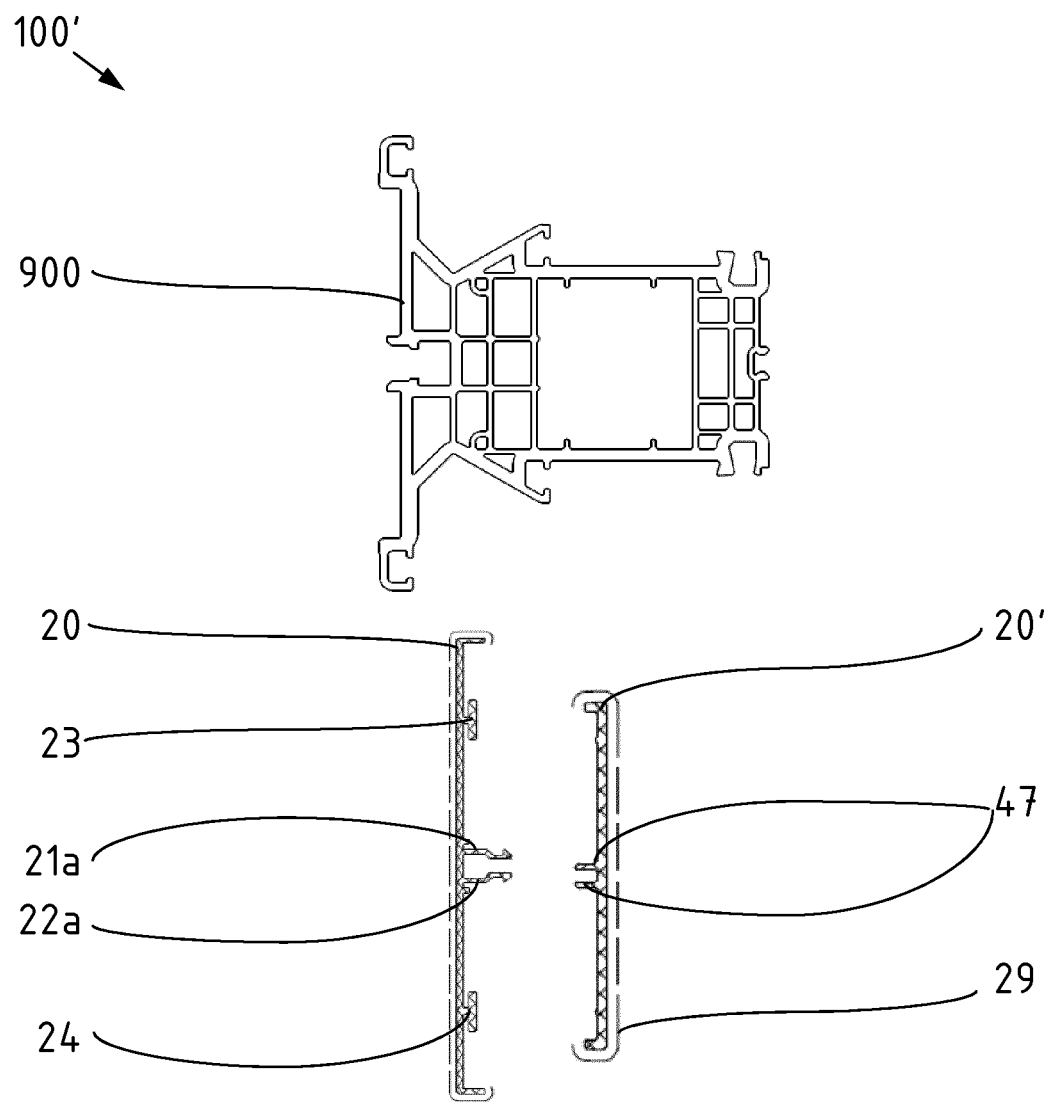
Figure 4G:
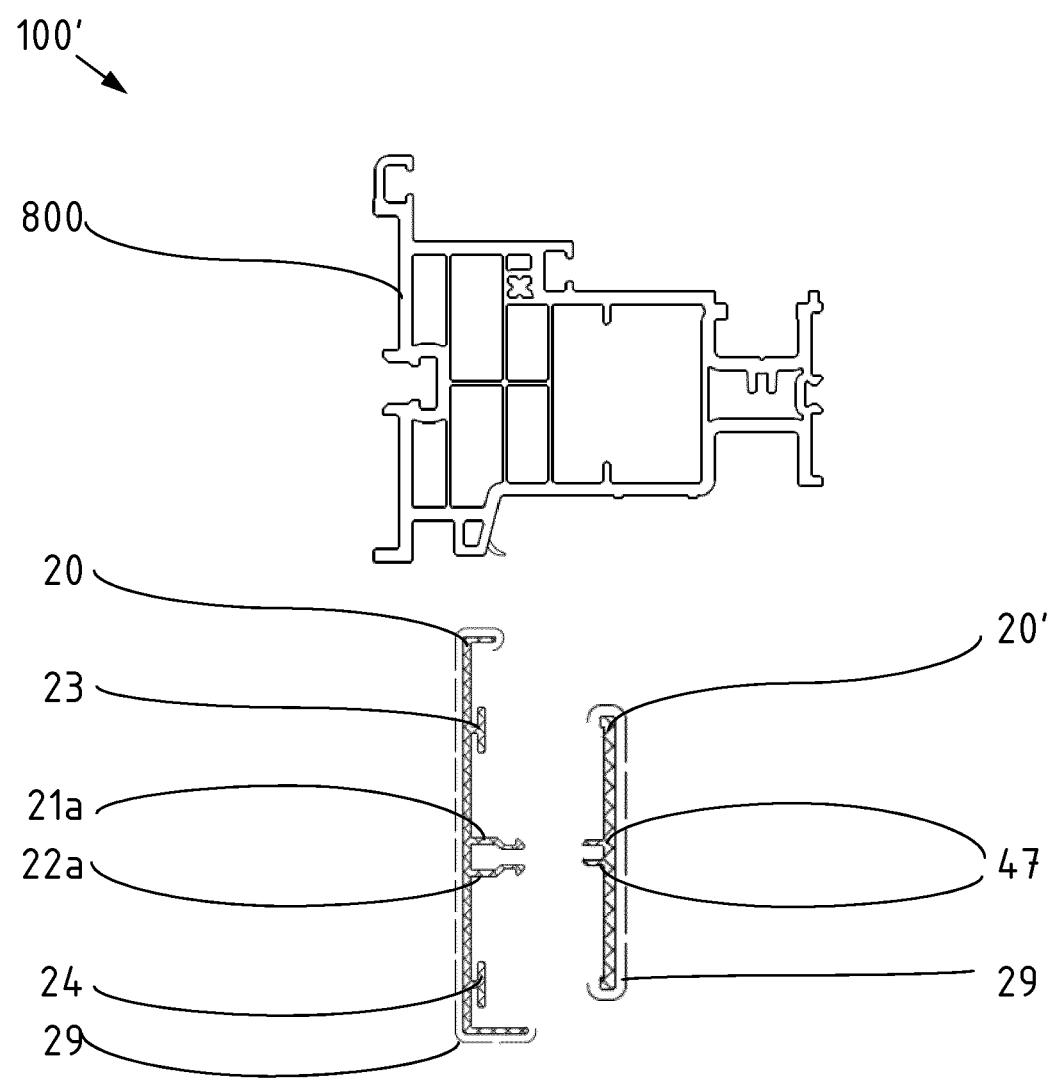
Figure 4H:
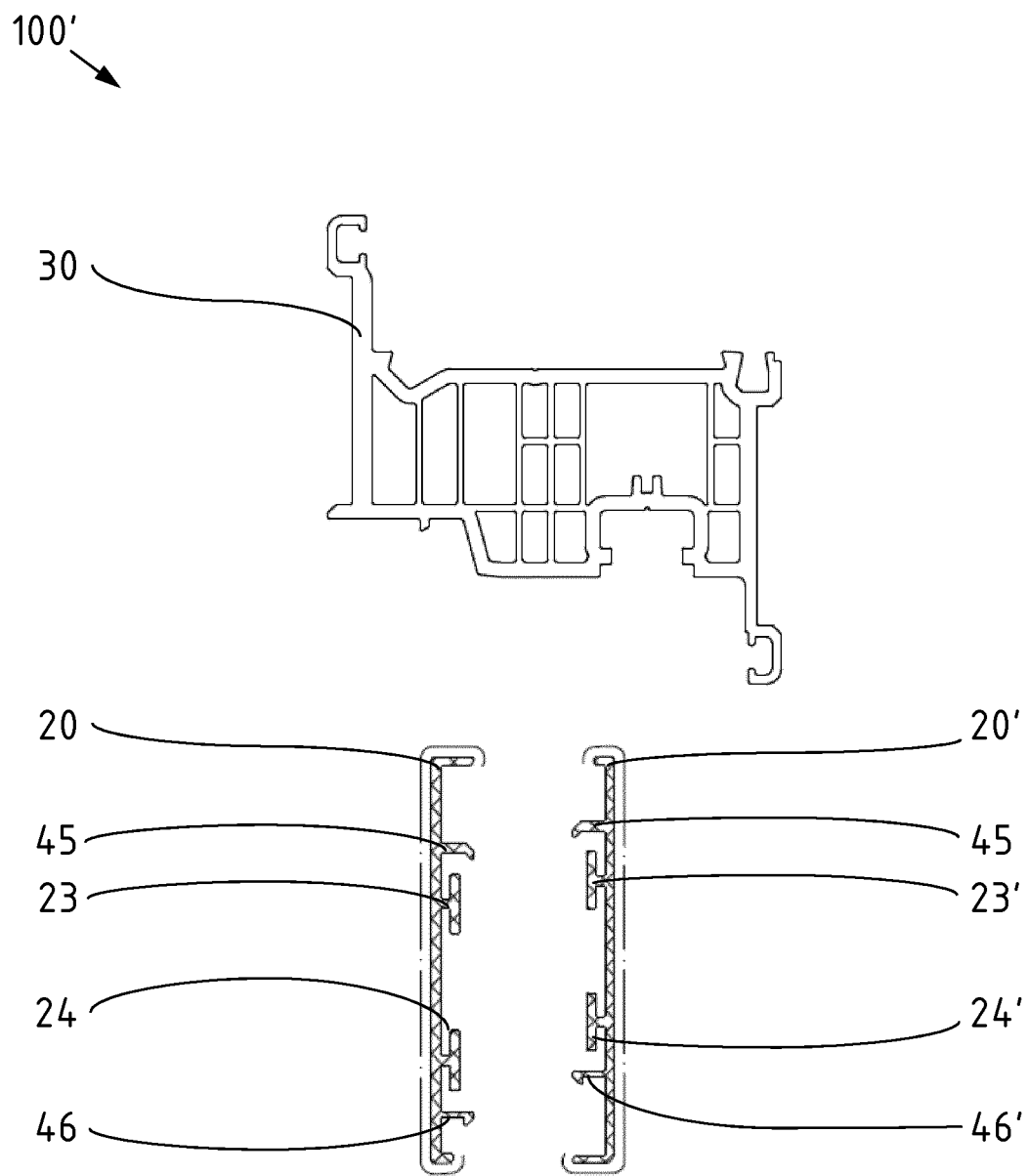

FIGS. 4e-4h show different variants of core profiles in the overall view, having the associated casing shells 40, 40', 20, 20' from aluminum for the interior and the exterior. FIGS. 4a and 4h illustrate the outer frame profile and the leaf frame profile according to FIG. 4b and are described there.

FIG. 4f shows an upright post profile 900 as an example of an outer frame profile which can likewise be cladded on both sides with casing shells 20, 20'. The external side is latched in a form-fitting manner to the upright post profile by way of centrically disposed latching webs 21a, 22a, and additionally connected in a materially integral manner to the upright post profile by way of adhesive applied to the adhesive feet 23, 24.

FIG. 4g shows a casement profile 800 which can likewise be cladded on both sides with casing shells 20, 20'. The external side is latched in a form-fitting manner to the upright post profile by way of centrically disposed latching webs 21a, 22a, and additionally connected in a materially integral manner to the upright post profile by way of adhesive applied to the adhesive feet 23, 24.

All casing shells from aluminum are able to be coated arbitrarily on the external and/or internal panel. The coatings can be, for example, in the form of additional, preformed shells from the most varied materials, or be embodied as decorative films or as a paint coating.

FIG. 5 illustrates a perspective view of the outer frame profile according to the invention, having machined casing shells on the picture fragment of the outer frame profile 10', for the casing shell 20' having a miter cut. It can be seen that only such parts of the material of the plastic hollow-chamber profile and of the casing shell which project in the outward direction beyond the groove base of the fastening groove, or functional web 10' and 11' respectively, have been subtracted. The groove base surface preferably remains entirely without damage in the process, such that no static weakening of the functional web formed by the fastening groove base whatsoever takes place.

FIG. 5a illustrates the leaf frame according to the invention, having the machined regions 1, 1', in the cross section. It is decisive that the overall profile, composed of the core profile 30 and the casing shells 40, 40' connected on both sides, when viewed from the respective external sides, is subtracted at most down to the groove base surface, preferably down to exactly the groove base, furthermore preferably without damaging the latter, thus preferably subtractively machined exactly by the maximum depth of the casing shells 40, 40' down to the machined plane 1a, 1a' that extends in the longitudinal direction. The machined plane here thus lies in or in front of the plane of the groove base.

FIG. 5b illustrates the outer frame according to the invention, having the machined regions 2, 2', in the cross section. Here too, exactly as is the case in the leaf frame, the overall profile, composed of the core profile and the casing shells 20, 20' connected on both sides, is subtracted at most down to the groove base of the fastening groove 10a, preferably down to exactly the groove base, in particular without damaging the latter, furthermore preferably thus subtractively machined exactly by the maximum depth of the aluminum casing shells 20, 20' down to the machined plane 2a, 2a'. This is depicted in this way in particular in terms of the casing shell on the left in the figure.

It can be seen in the right casing shell that the subtraction, when viewed from the outside, ends significantly ahead of the groove base, specifically by the thickness of the adhesive ahead of the groove base, the casing shell by way of the maximum thickness thereof is thus in particular only completely subtracted by way of the subtractive machining (when viewed) from the external side. The adhesive strands below the adhesive feet of the casing shell remain untouched in the process.

In all potential embodiments, as much material as is required for the complete removal of the casing shell is preferably at most subtracted from the core profile in the subtraction region during the respective subtractive machining. In the process, only those proportions of material are preferably exclusively removed from the core profile in the subtraction region that in an outward direction project beyond the groove base surface of the fastening groove, or lie outside in front of the plane of the groove base surface, respectively.

In particular if an engagement of the subtracting tool in the groove base cannot be avoided, the groove base is preferably subtracted by not more than 1% of the thickness thereof.

In all embodiments of the subtractive machining, the groove base is particularly preferably not touched by the subtracting tool.

The casing shells are always conceived such that the outer plastic functional webs, thus the respective groove bases, are not destroyed when machining the casing shells.

The following method steps are to be carried out in order for the depicted leaf/frame system of window or door frames from plastics material, having casing shells, preferably aluminum casing shells, to be produced:

1. The core profile is extruded as a leaf frame core profile and/or an outer frame core profile to a desired production length, for example of 6.5 m, having the outwardly open fastening grooves.
2. On the functional faces 11" formed by the respective fastening groove base, adhesive 17', 18' in the form of adhesive strands (tracks) is applied across the entire length of the profiles to the statically structural functional web 11" formed by the fastening groove base. 3. The casing shell 20' is cut to length to the desired longitudinal dimension, for example the production length of 6.5 m, by means of the latching cams 21', 22' positioned and fixed in a form-fitting manner on the undercuts 12', 13' on the core profile 10, 30.
3. The adhesive can be understood to be in liquid form, or to be a double-sided adhesive tape.
4. The adhesive feet 23', 24' in the latched position are pressed in a materially integral manner onto the adhesive 17', 18'.
5. A semi-finished product capable of processing of the desired production length, for example 6.5 m, is manufactured.
6. During the first 24 hours, curing takes place in the store.

FIG. 6 illustrates the detailed view of a corner connection of the leaf/frame system according to the invention, when viewed from the outside of the building.

LIST OF REFERENCE SIGNS 100, 100' Leaf/frame system
900 Upright post profile
800 Casement profile
a, b, H Spacing
1, 1', 2, 2' Machined regions
1a, 1a', 2a, 2a' Machined planes in the cross section
10, 10' Core profile for the outer frame
10a Fastening groove in the external wall of the outer frame core profile
11, 11" Structural functional webs, groove base of the fastening groove
12, 13, 12', 13' Undercut in the fastening groove wall
14, 14' Detent seal
15, 15' Outer frame foot
16 Glass strip groove
17, 18, 17', 18' Adhesive
19 Seal receptacle groove
20, 20' Casing shell
21, 21', 22, 22' Latching cam
21a, 21'a, 22a Latching webs, positioning web
23, 23', 24, 24' Adhesive foot
23a, 23'a, 24a, 24'a Latching protrusion
27, 28, 27', 28' Adhesive
29 Coating
30, 30' Core profile for the leaf frame
30a Fastening groove in the external wall of the leaf frame core profile
31, 31" Structural functional webs, groove base of the fastening groove
32, 33, 32', 33' Undercut in the fastening groove wall
34 Detent seal
35, 36 Glass seal
37, 38, 37', 38' Adhesive
38 Glass strip groove
39, 39' Seal receptacle groove
40, 40' Casing shell
41, 42, 41', 42' Latching cam
43, 43', 44, 44' Adhesive foot
45, 45' Reference web
46, 46' Connection element
46a Wedge nose
46b Soft PVC (=Connection partner/mating piece)
47 Centering webs
50, 50' Glass strip
60 Glass insert 61 Glass rebate
70, 80 Steel reinforcement
90 Miter line

The invention claimed is:

1. A frame profile of an outer frame and/or a leaf frame of a window or a door, the frame profile comprising a core profile of a plastics material, wherein a casing shell is disposed on at least one external wall of the core profile, wherein the at least one external wall has at least one fastening groove that extends in a longitudinal direction across an entire length of the core profile, via which fastening groove the at least one external wall in a region of the fastening groove is repositioned inward into the core profile, and a groove base of the fastening groove has a height which is at least 50% of a total height of the at least one external wall of the core profile, wherein the casing shell is fastened in the fastening groove and covers the fastening groove, and the casing shell on an internal face thereof that points toward the core profile has a pair of fastening elements which are spaced apart in a height direction and protrude toward the core profile and via which the casing shell is not adhesively fastened in the fastening groove, wherein a fastening element as a reference web is configured with a run-up ramp or a run-up curve pointing toward the groove base, the reference web having a greatest thickness of all the fastening elements and being configured to be brought to bear on the at least one external wall with the fastening groove and serving as a detent in a corner of the fastening groove and as a spacer in relation to a vertically running groove base, wherein disposed between the pair of fastening elements, via which a non-adhesive fastening is achieved, is at least one further pair of adhesive feet which are spaced apart in the height direction and via which an additional adhesive connection is implemented, via which additional adhesive connection the core profile is combined with the casing shell by an adhesive bonding so as to be resistant to shear.

2. The frame profile as recited in claim 1, wherein the groove base of the fastening groove is formed by a web of the core profile that runs in the height direction of a hollow-chamber profile which forms the core profile and externally delimits the core profile.

3. The frame profile as recited in claim 2, wherein the web that forms the groove base is a web which predominantly contributes toward a static load-bearing capability of the frame profile in that the web has a greatest thickness of all the webs of the core profile.

4. The frame profile as recited in claim 1, wherein the fastening element is configured as,
a latching web for interacting in a latching manner with an undercut on the at least one external wall with the fastening groove or with a depression generated by a displacement of a material on the at least one external wall with the fastening groove by the latching web per se, and/or
a connection element which is configured as a web that projects in the direction toward the fastening groove base and which, at least in regions, is able to be brought to bear in a contacting manner on a connection partner and/or is able to be embedded in the connection partner that is fastened to the at least one external wall with the fastening groove, and the connection partner is configured from a material which is softer in comparison to the material of the core profile and/or the casing shell, and/or
a positioning web/latching web which tapers in the direction toward the core profile and via which, as a result of a contact with the at least one external wall with the fastening groove, the casing shell is able to be aligned in relation to the core profile.

5. The frame profile as recited in claim 1, wherein the casing shell on at least one of the edges that run in the longitudinal direction has an angled collar, and is configured so as to be L-shaped, wherein the angled collar bears in a contacting manner on a seal inserted in the core profile.

6. The frame profile as recited in claim 1, wherein a glass strip of the frame profile that forms a leaf frame is configured from a material of the casing shell, wherein an external face of the glass strip is aligned so as to be flush with an external face of the casing shell.

7. The frame profile as recited in claim 6, wherein the casing shell on the core profile of the outer frame and the casing shell on the core profile of the leaf frame that are disposed on an inside and/or on an outside of the profiles, are disposed so as to be flush with visible faces of the casing shells in a same plane.

8. The frame profile as recited in claim 1, wherein the respective casing shell is of a single-wall configuration and does not comprise any hollow chambers.

9. A method for producing the frame profile as recited in claim 1, the method comprising:
extruding a core profile from a plastics material so as to provide a hollow-chamber profile having at least one fastening groove in at least one external wall of two opposite external walls of the core profile, via which fastening groove the external wall with the fastening groove in a region of the fastening groove is repositioned inward into the core profile and of which the groove base has a height which is at least 50% of a total height of the external wall with the fastening groove of the core profile, to a predetermined length;
manufacturing at least one casing shell having fastening elements on internal faces of the casing shell that point toward the core profile, to the predetermined length;
non-adhesively fastening the at least one casing shell in the fastening groove of the external wall having the fastening groove of the core profile via a pair of fastening elements, of which one fastening element is configured as a reference web having a run-up ramp or a run-up curve which points toward the groove base and which has a greatest thickness of all the fastening elements and which is brought to bear on the external wall with the fastening groove and which serves as a detent in the corner of the fastening groove and as a spacer in relation to the vertically running groove base; and
adhesively fastening by way of at least one further pair of adhesive feet, which are spaced apart in a height direction, between the pair of fastening elements by way of which the non-adhesive fastening is achieved, the core profile by way of the further pair of adhesive feet being combined with the casing shell by adhesive bonding so as to be resistant to shear.

10. The method as recited in claim 9, wherein at least one adhesive strand which extends in the longitudinal direction of the fastening groove is incorporated into the fastening groove during the extrusion, and a respective casing shell, by way of at least one fastening element, is connected to the core profile in a materially integral manner so as to be resistant to shear, by the at least one adhesive strand.

11. The method as recited in claim 9, wherein, during the extrusion of the core profile from the plastics material having at least one fastening groove, in the at least one fastening groove, a connection partner is integrally extruded on the at least one external wall with the fastening groove so as to point toward the interior of the groove, the connection partner being from a material which is softer than the plastics material of the core profile, and when fastening a casing shell at least one of the fastening elements thereof is brought to bear in a contacting manner on the connection partner and/or is embedded in the connection partner as a result of a material displacement generated in the connection partner by the fastening element.

12. The method as recited in claim 9, wherein the core profile is a PVC (Polyvinyl Chloride) core profile, and a respective casing shell is aligned parallel to the PVC core profile and by way of at least part of the fastening elements thereof is fastened to the external wall having the fastening groove.

* * * * *